May 30, 1944.    R. PEALE ET AL    2,349,914
MATERIAL LOADING AND CONVEYING
Filed March 10, 1942    11 Sheets-Sheet 5
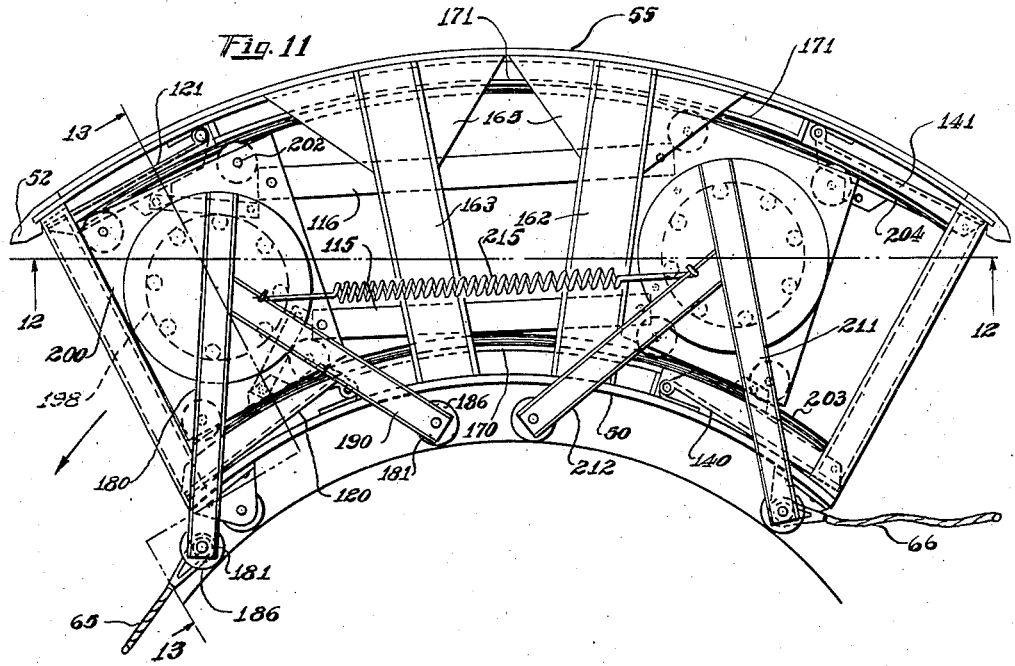
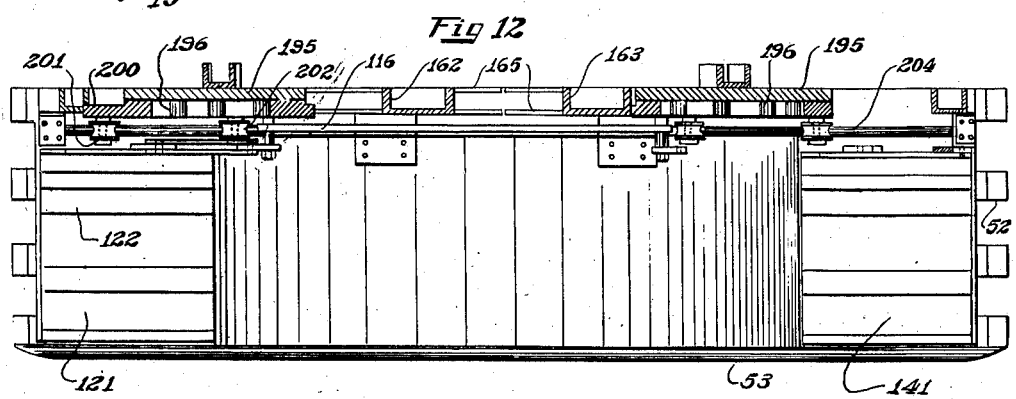
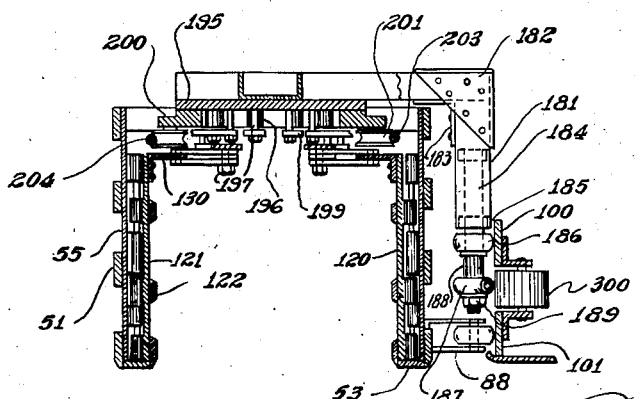

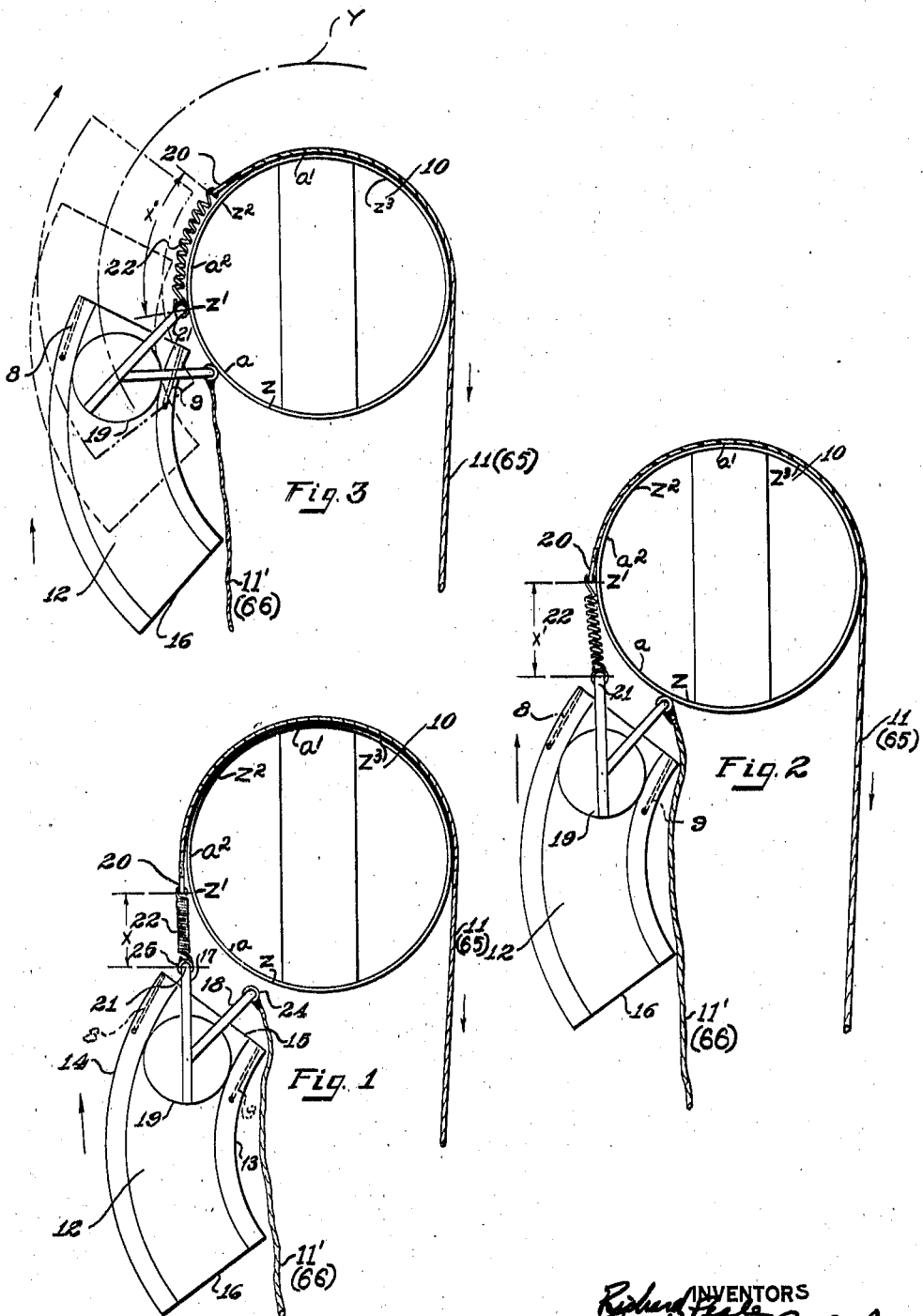

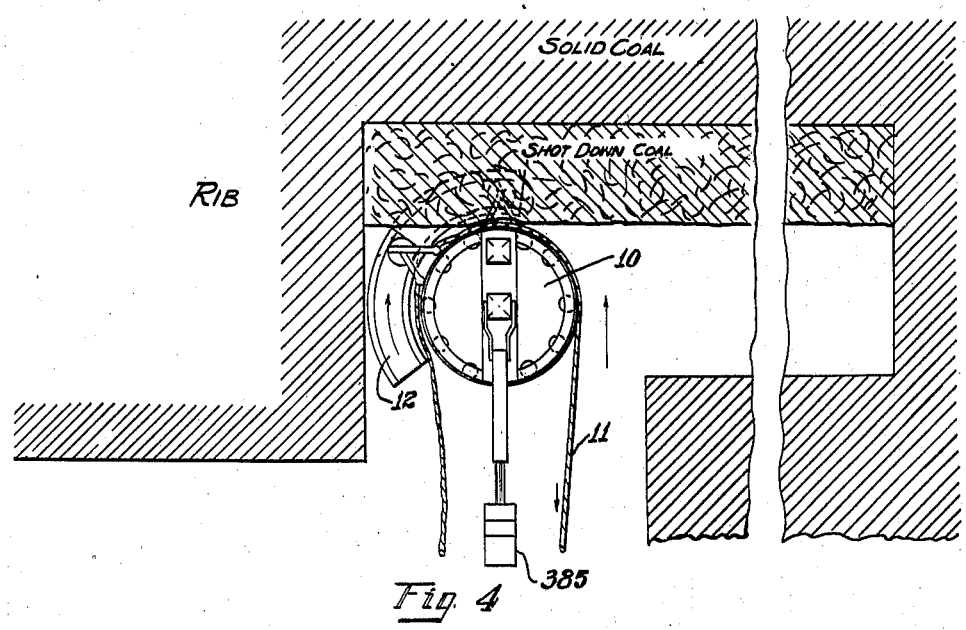
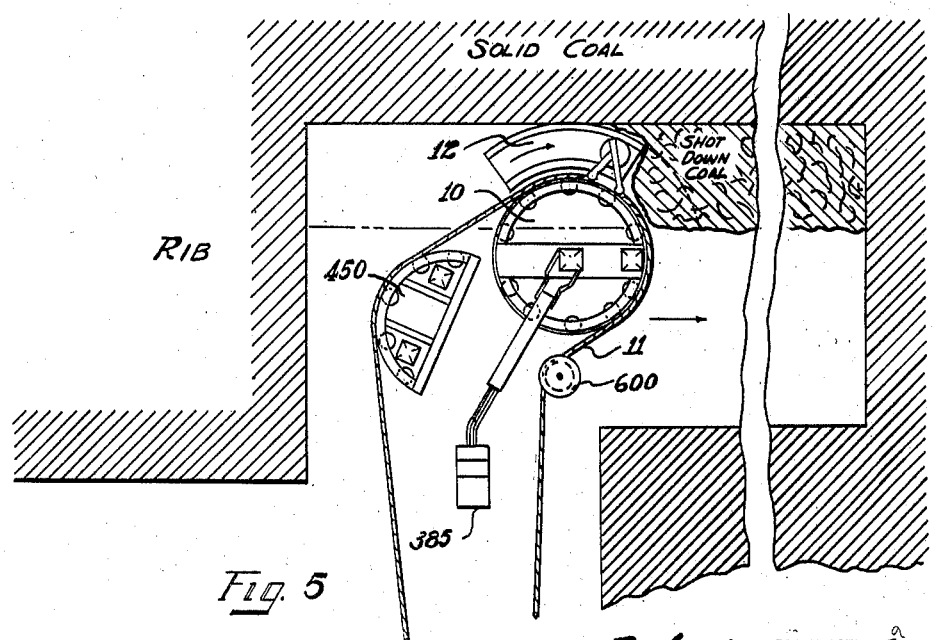

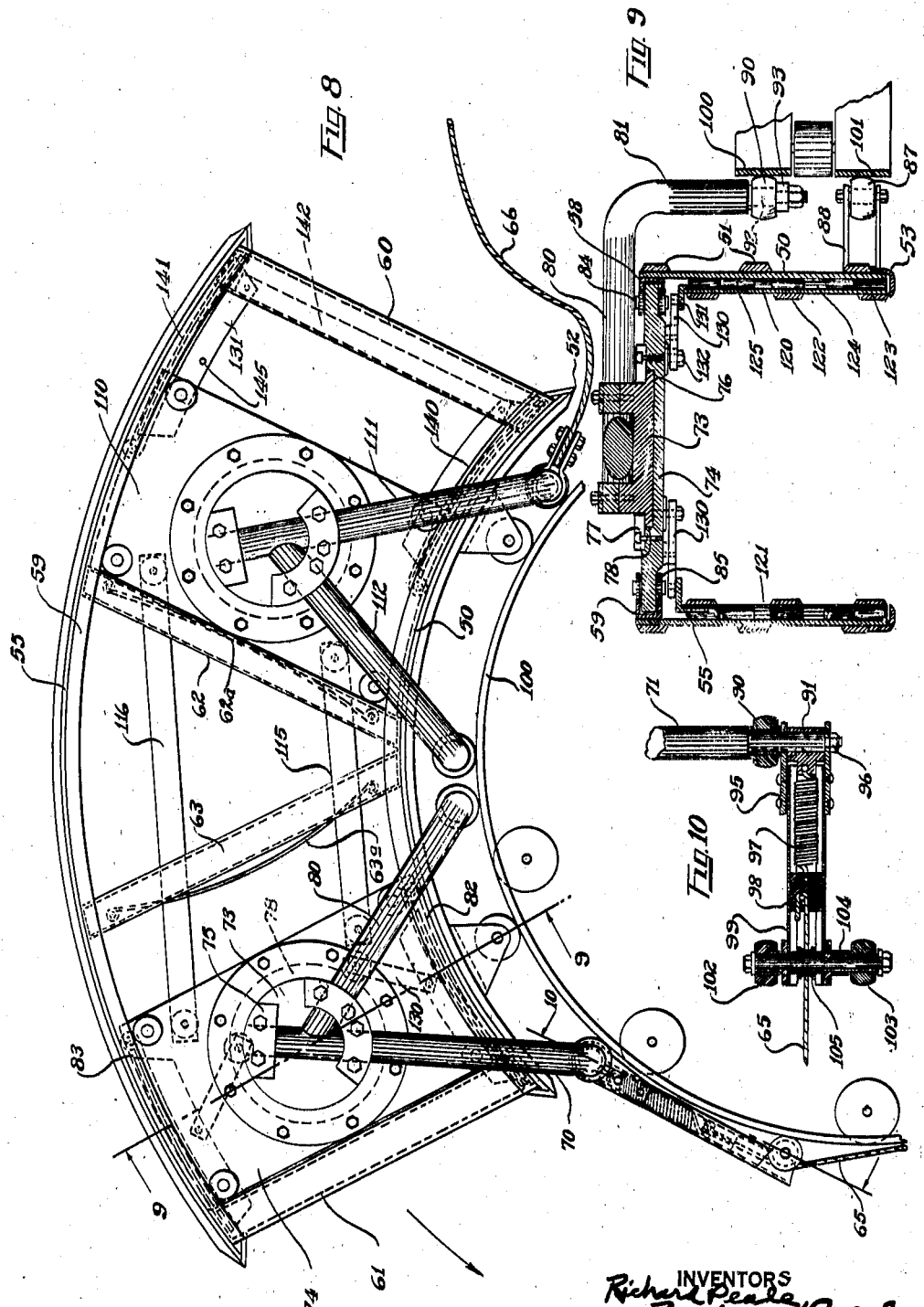

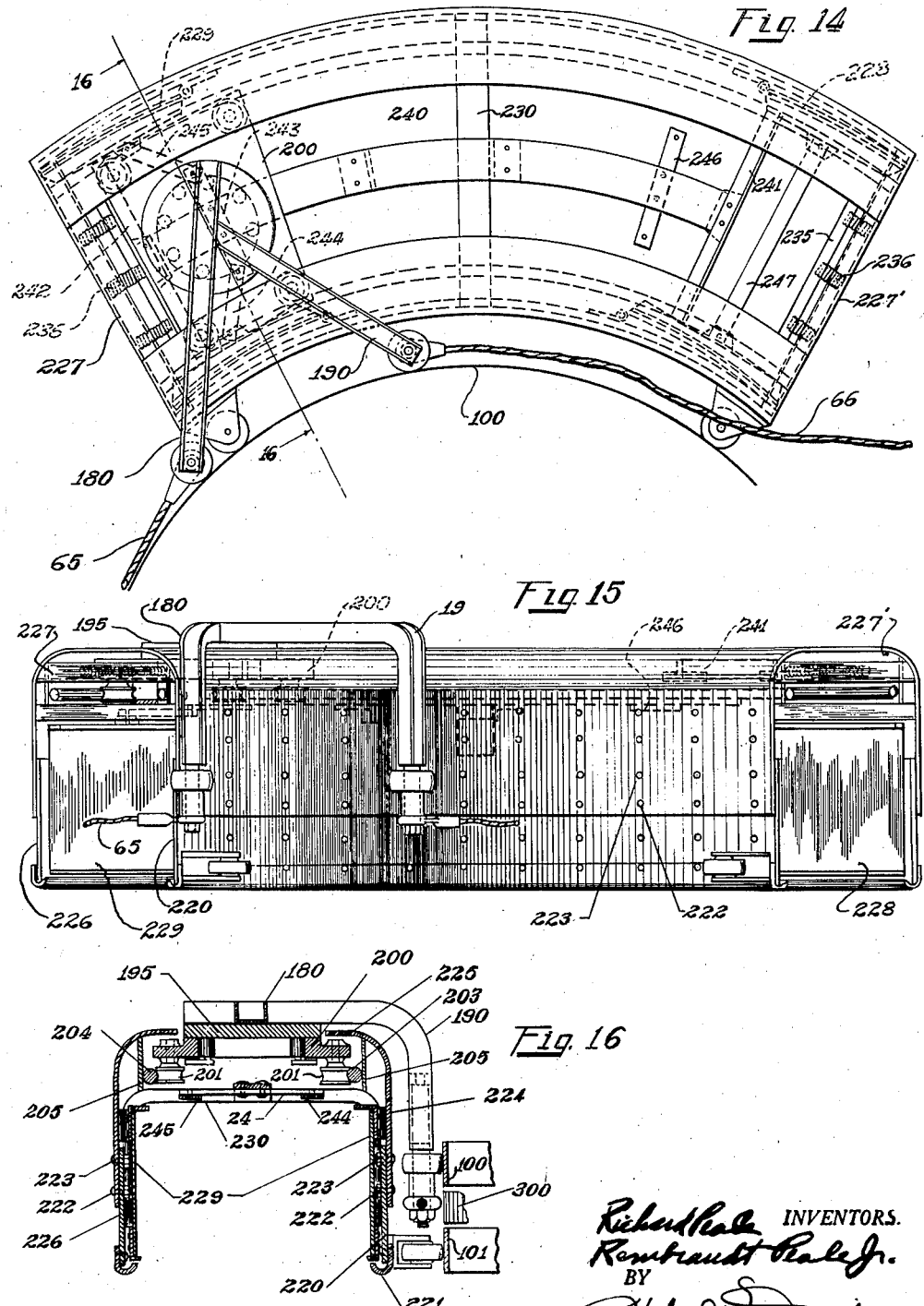

May 30, 1944.　　　R. PEALE ET AL　　　2,349,914
MATERIAL LOADING AND CONVEYING
Filed March 10, 1942　　　11 Sheets-Sheet 7
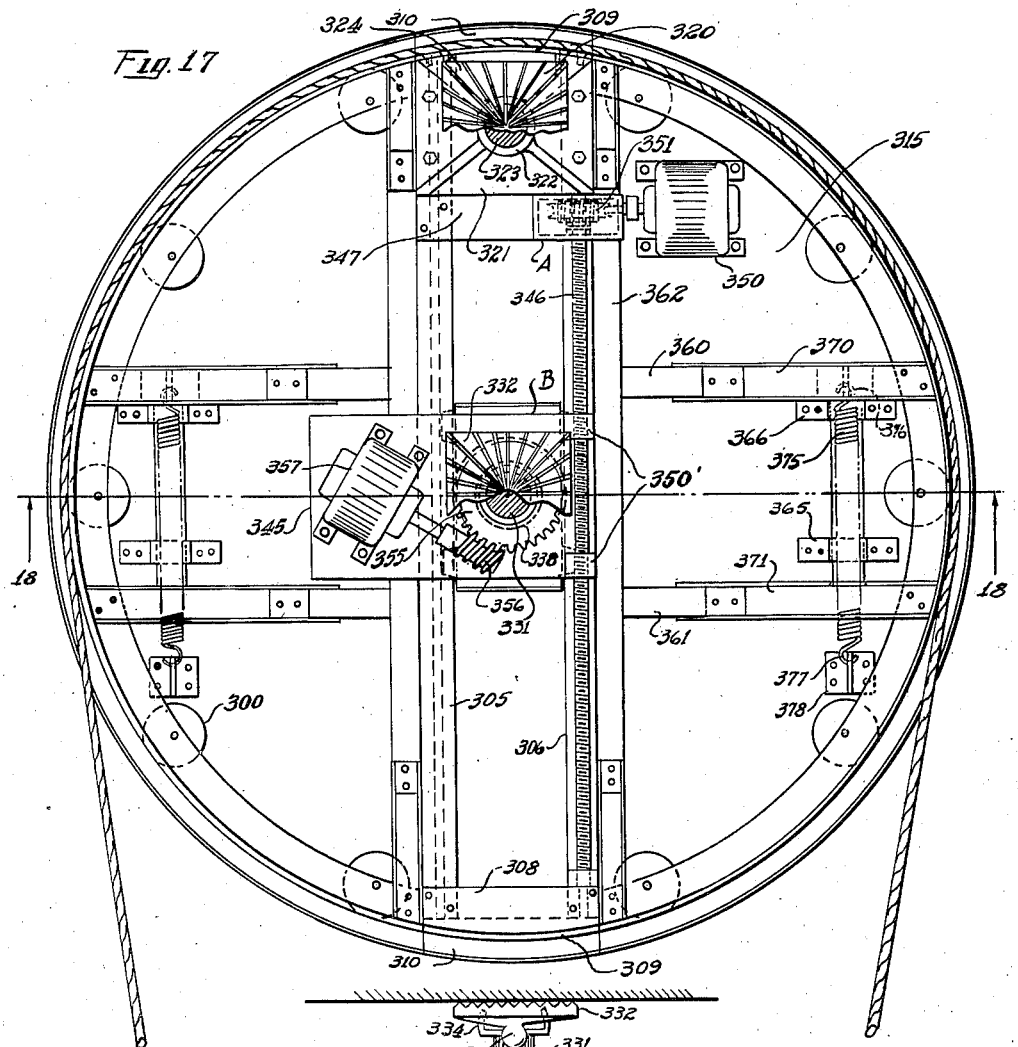
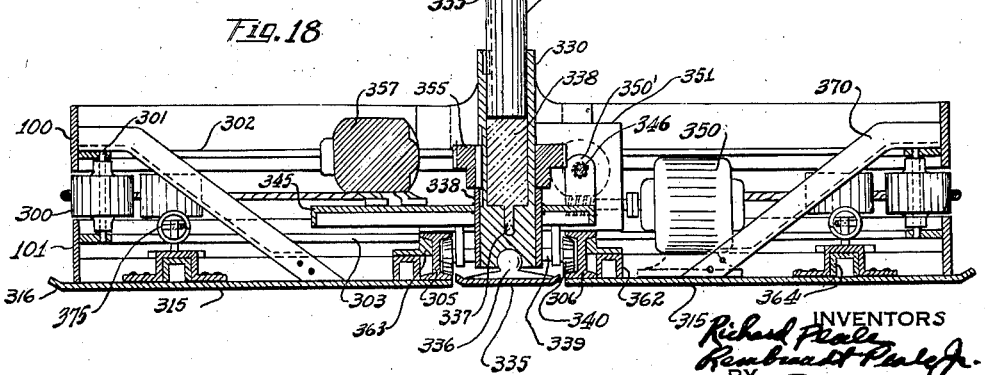
INVENTORS
Richard Peale
Rembrandt Peale Jr.
BY
ATTORNEY May 30, 1944.  R. PEALE ET AL  2,349,914
MATERIAL LOADING AND CONVEYING
Filed March 10, 1942  11 Sheets-Sheet 8
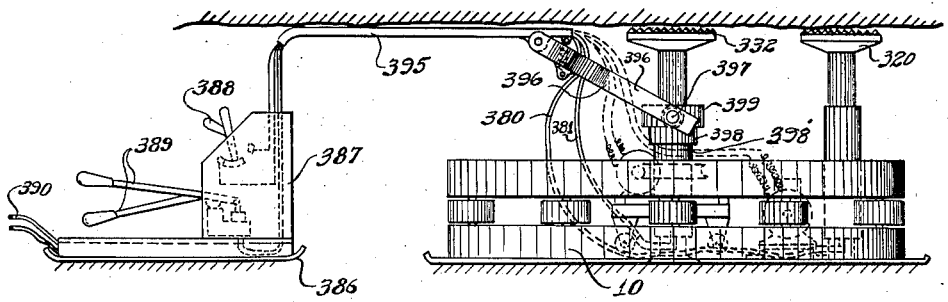
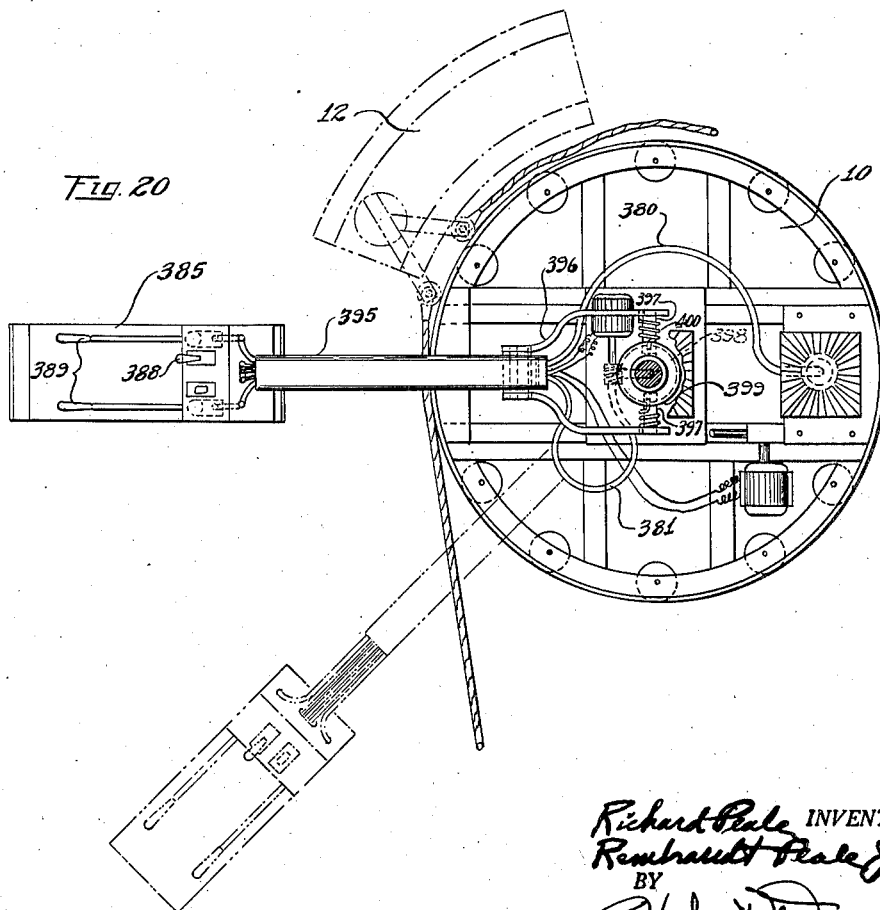

May 30, 1944.   R. PEALE ET AL   2,349,914
MATERIAL LOADING AND CONVEYING
Filed March 10, 1942   11 Sheets-Sheet 9

Richard Peale
Rembrandt Peale Jr.
INVENTORS.
BY
Robert Windham
ATTORNEY

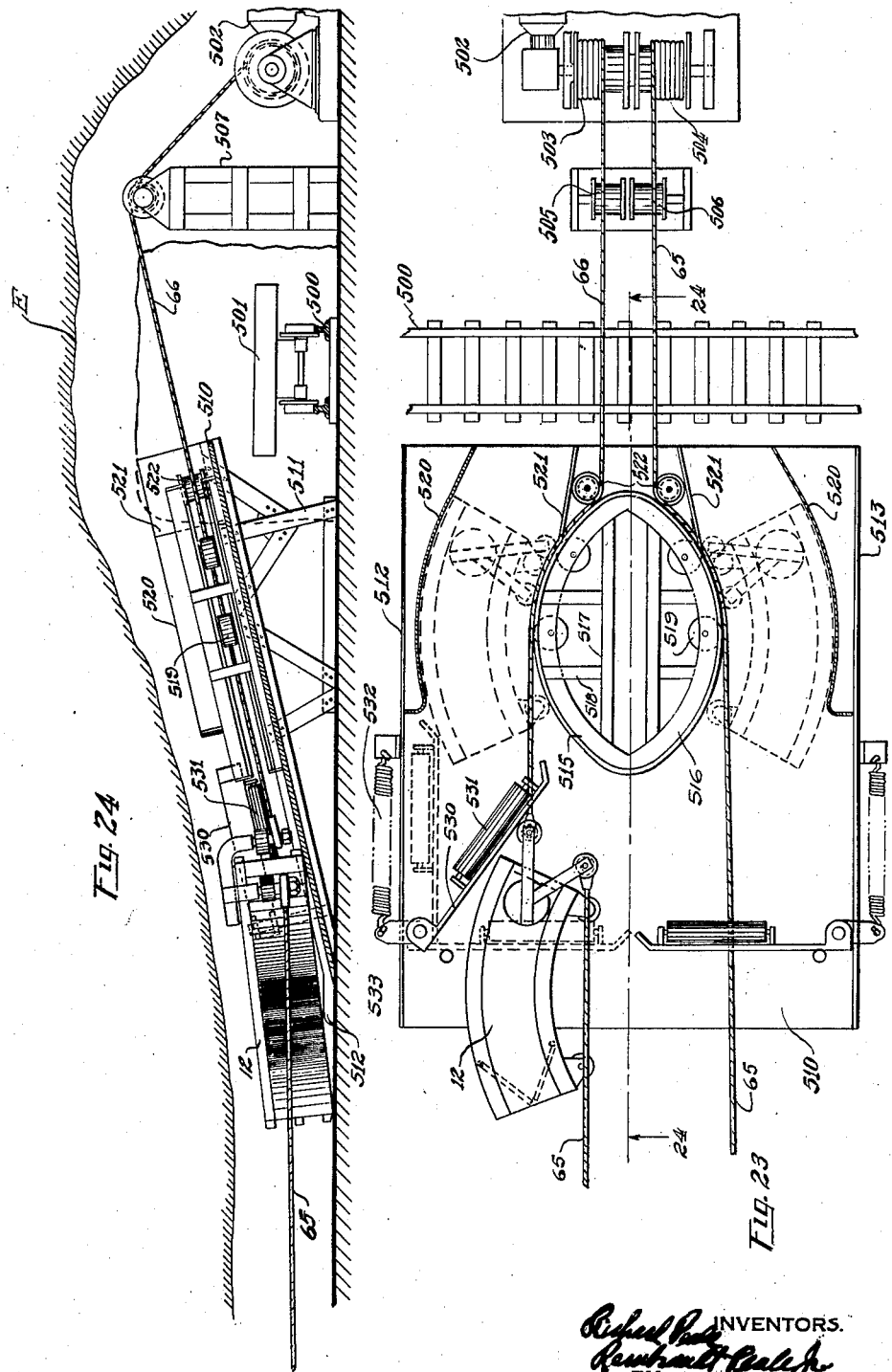

Patented May 30, 1944

2,349,914

UNITED STATES PATENT OFFICE 2,349,914

MATERIAL LOADING AND CONVEYING

Richard Peale, Clearfield, Pa., and Rembrandt Peale, Jr., Greenwich, Conn.

Application March 10, 1942, Serial No. 434,070

27 Claims. (Cl. 37—115)

The invention relates to new and useful improvements in automatic material loading and conveying apparatus more particularly for loading and conveying shot down coal in coal mines having very thin coal seams.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a diagrammatic plan view of an embodiment of the invention showing a skip being drawn toward a guiding platform;

Fig. 2 is a view similar to Fig. 1 showing the skip and guiding platform in their position of first contact;

Fig. 3 is a similar view showing a more advanced position of the skip in its movement toward and about the platform;

Fig. 4 is a similar view showing the skip in position to load out coal in an advancing room;

Fig. 5 is a similar diagram showing loading of the coal in crossing the face of a room;

Fig. 8 is a top plan view of a skip mechanism comprising the invention;

Fig. 9 is a vertical section on line 9—9 of Fig. 8;

Fig. 10 is a transverse vertical section on line 10—10 of Fig. 8;

Fig. 11 is a top plan view of a modified form of skip;

Fig. 12 is a longitudinal vertical section on line 12—12 of Fig. 11;

Fig. 13 is a transverse vertical section on line 13—13 of Fig. 11;

Fig. 14 is a top plan view of another modified form of skip;

Fig. 15 is a side elevation of the ship shown in Fig. 14;

Fig. 16 is a transverse vertical section on line 16—16 of Fig. 14;

Fig. 17 is a plan view of the circular skip-guiding platform comprising a part of my invention;

Fig. 18 is a vertical section on line 18—18 of Fig. 17;

Fig. 19 is a reduced side elevation of the mechanism shown in Fig. 17 together with control apparatus therefor;

Fig. 20 is a partly diagrammatic plan view of the apparatus shown in Fig. 19;

Fig. 23 is a top plan view of a ramp and skip-guiding apparatus in connection therewith;

Fig. 24 is a vertical section on line 24—24 of Fig. 23; and

Figure 6:
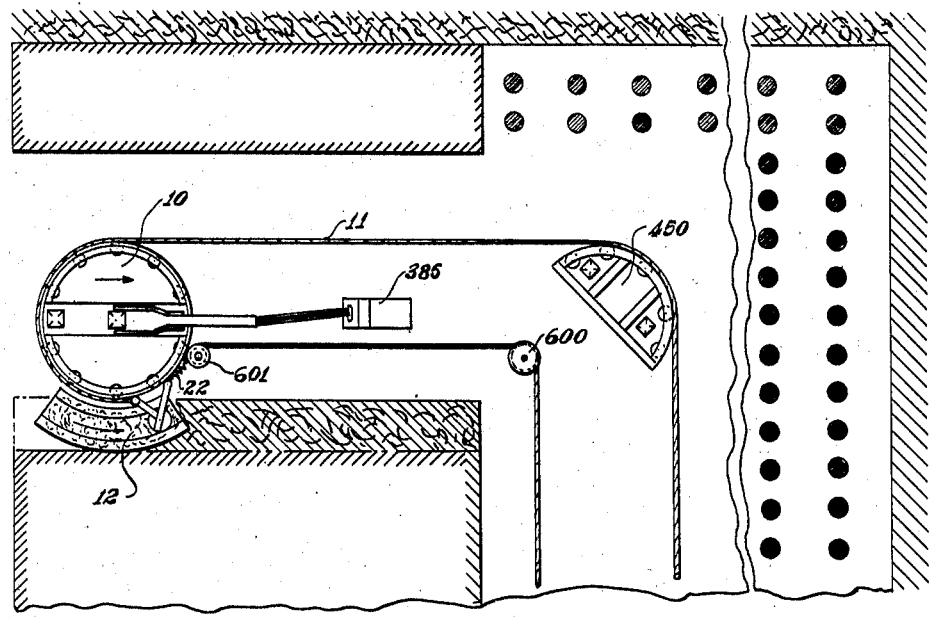
Fig. 6 is a similar diagram showing the invention in the operation of taking out a pillar.

The invention is directed, in its present principal commercial application to conveying coal from a room face, or other working face, in a coal vein of very small thickness to the entry, or other place of discharge, delivering it there by an automatically loading, conveying and unloading mechanism, dispensing with hand shoveling of the material, and the building and use of tracks in the room, or other working face.

It will be obvious, further, that the invention is likewise applicable to loading and conveying material in other connections and in other kinds of work than that described, including coal mining in seams of normal or greater height, although the invention is peculiarly adapted for the easy, simple and economical handling and transportation of coal in thin coal seams.

Economic conditions compel the working of very thin coal seams (generally thirty inches thick or less), and due to the hardship of working in the restricted space, it is very difficult to secure men for such work, and the efficiency of workers in such restricted space is naturally greatly impaired and diminished. One of the difficult problems in operating very thin coal seams is the conveyance of the mined coal from the room face to the entry within reasonable and practical cost limits. The present invention effects this without requiring human labor, without blasting the top or bottom of the room and without building tracks, or using human labor in loading or propelling cars. In thin seams of coal the legal requirements for timbering substantially reduce the space available for mining and loading operations. One object of the invention is therefore to provide means for loading out the coal with a minimum of handling, requiring the fewest number of trips for the loading mechanism to and from the working face and especially requiring the minimum time and space for positioning the loading means during its operative phase in the mining cycle. Accordingly, the invention provides apparatus capable of loading out a large volume of shot-down coal while occupying relatively little space and requiring little power, being easily movable from place to place and requiring no additional space for maneuvering in such movements. By use of the invention timbering can follow the mining operations very closely while the time occupied by loading in the mining cycle is substantially reduced.

Other objects of the invention are to provide an automatic loading apparatus adapted to enter into the shot-down pile of coal at a room face, for example, automatically become charged with coal and then withdraw with the load of coal to the entry where the load is discharged into a car or other conveyance. In connection with this general object, we provide means for guiding and positioning the conveyor skip or loading receptacle so that it may travel into piles of shot-down coal and remove same with a minimum of clearance room in the mine, regardless of the position of the coal face and the relation of the guiding mechanism thereto. In accordance with one feature of the invention the loading skip and its guiding mechanism are so shaped and dimensioned as to occupy the minimum space regardless of the position and direction of loading movement in the mine.

This feature of the invention is of great importance, especially in the loading of thin seams, because it permits timbering of the mined-out areas very close up to the working face and the timbering can be so maintained regardless of the direction of loading and mining; that is, regardless of whether one is driving a room, making a cross-cut or taking out a pillar or any other usual or unusual mining operation. This feature of the invention also makes it possible to maintain the skip-operating cables and other power devices in a narrow and generally straight line along the rib and face of the coal so that the mined-out area can be fully timbered without necessity of leaving room for cross-over cable lines or for the turning and other positional changes of the loading and mining apparatus.

Other advantages possessed by the invention include the ability to load out shot-down coal with a minimum amount of travel of the loading and conveying mechanism; the ability to take up virtually a complete skip load on every trip; and means for automatically moving and handling the loading mechanism without exhaustive power requirements and/or serious stresses in the system at any phase of the operating cycle. Wedging and jamming of the mechanism by pieces of coal or rock is avoided by the design.

In general the improved apparatus of the invention comprises a cable or rope-operated skip or receptacle which is advanced into the pile of shot-down coal on its inward movement toward the mine face and which is withdrawn in the reverse direction over the same path with a full load of coal. A skip-guiding platform, preferably circular in form is positioned to provide a guide and bearing surface for the skip as it is directed against and into the pile of shot-down coal. The skip is attached to the rope drawing it into the coal by a pivoted draft connection and guider or shifter including an off-set fender arm or guiding and bearing member which acts as an intermediate turning and guiding means between the skip and the guiding platform whereby the skip is caused to adjust itself into and out of concentric bearing contact with the platform and to travel about the periphery thereof in a circular path. The skip is arcuate in shape so that in its loading and guiding movements it conforms to and bears against the periphery of the circular platform. This is a very important aspect of the invention because thereby the skip and platform always take up the same minimum amount of space regardless of the position they may occupy while the full width of the skip is available for receiving coal. That is, the travel of the skip while in contact with the circular platform is always in a circular path so that no part of the skip ever projects beyond or outside the circumference of that circular path during its turning and guiding movements.

Said circular guiding platform may be provided with jacks for holding it in position and with mechanized advancing and direction changing means whereby it may be moved angularly and/or linearly in any desired direction and to any desired extent. Moreover, said platform moving devices and the jacks or any means for holding said platform in position are all preferably mounted within the perimeter of the circular platform so that it never occupies more than its minimum circular space no matter where or how it is moved.

It will be understood that the foregoing general description and the following detailed description as well are exemplary and explanatory but are not restrictive of the invention. Referring now in detail to the present preferred embodiment of the invention, illustrated by way of example in the accompanying drawings, the general principles of construction and operation of the invention are shown somewhat diagrammatically in Figs. 1 to 7 and will be first briefly described to give a general understanding thereof. As shown in Fig. 1, there is provided a circular support and guide member or platform 10 which is adapted to be held at any desired locus on the mine floor and there to serve as a guide for the skip, the head rope 11 and the tail rope 11', one end of each of which ropes is attached to a conventional power-driven drum (not shown) while its other end of each rope is connected to the loading skip 12 as hereinafter described. The details of construction of the circular platform 10 will hereinafter be fully set forth. In general the coal loading and conveying skip 12 is an arcuate frame having two vertical curved side walls 13 and 14, open ends 15 and 16 and no bottom. The curved sides 13 and 14 are concentric with the periphery of the platform 10 and terminate at the head end 15 in two pivoted doors 8 and 9.

At the head end 15 of the skip there is provided a draft connection including a pair of arms 17 and 18 to which the head and tail ropes are, respectively, attached. These arms are rigidly connected together to diverge in a V-shape from a pivotal bearing or a turn table 19 in the top of the skip. The end 20 of the head rope 11 is connected to the free end 21 or arm 17 of the skip, preferably by an intervening spiral spring 22 so as to provide a resilient shock absorbing connection therebetween. When the head of the skip is remote from the platform 10 and being advanced toward same by the pull of the head rope 11, the arm 17 extends in the direct line of pull of the head rope and in the general line of the major axis of the skip in its direction of movement along the mine floor while the arm 18 projects at an angle from the skip tangential to the surface $a$ for contact therewith in the forward travel of the skip. The arms 17 and 18 are adapted to turn in a horizontal plane with the turn table 19 from a position shown in Fig. 1 to one wherein the arms extend beyond the inner end wall 13 of the skip and the free ends of the arms lie along the outer side of said wall of the skip as shown in Fig. 4, for example.

In accordance with the invention the arms 17 and 18 are designed to ease and guide the skip into concentric conformity with the periphery of the platform 10 when drawn toward and against same by the pull of the head rope 11. Said arms also serve to bring the skip into concentric relation with the platform so that the general path of movement of the skip is from one of substantial tangency to the platform while approaching the same to one of concentricity as it travels along and about the periphery of the platform in bearing relation thereto. The pivoted arms 17 and 18 also function as fenders or buffers to take up a part of the impact of the skip against the platform, translating and absorbing a part of the stress thereon into rolling frictional movement so that the skip is guided into bearing position against the platform with a minimum of shock and stress. The spring 22 connecting the head rope and the arm 17 also cooperates in reducing such shock and stress.

The successive movements of the skip in approaching and bearing against the platform are illustrated in Figs. 1 to 4. Fig. 1 shows the skip advancing from the unloading point or station toward the rear of the platform 10. As shown in Fig. 2 the first element of the skip to encounter the periphery of the platform is the divergent inner arm 18 which has a horizontally rotatable bearing roller 24 at the end thereof. A similar roller 25 is provided at the end of the arm 17. When the roller 24 of arm 18 encounters the periphery of the platform 10 (Fig. 2) it imparts a horizontal turning movement to the arms 17 and 18 and a lateral shifting or turning movement to the skip so that the arm 17 next is drawn against the periphery of the platform whereby, as shown in Fig. 3, the rollers 24 and 25 of both arms are in spaced bearing relation to the periphery of the platform, while the forward edge of the skip is still spaced therefrom by the interposition of said arms. From then on the skip travels in the path of the broken line Y (Fig. 3) and into complete concentricity with the platform as shown in Fig. 4. In the latter position it will be noted that the arms continue to space the inner wall 13 of the skip from the wall of the platform and thereby act as the primary bearing means between the platform and the skip.

The spring 22 serves to take up the major portion of the shock between the skip and the head rope as the skip arms strike against the platform. The spring is stiff enough to resist extension under pull when the skip is empty and free for travel on the mine floor. Some extension X' of the spring is caused by the first impact of arm 18 against the platform (Fig. 2) while a further stress X" is placed on the system by the contact of the second arm 17 (Fig. 3). This stress is somewhat gradually absorbed by the spring as the skip swings into the final position of Fig. 4.

Having moved into concentric bearing relation with the platform, the skip is then drawn into the pile of shot-down coal S (Fig. 4) to a point where it becomes charged with coal. Pull on the head rope is then relaxed and the tail rope tightened to transmit motion through the draft connection to the skip to withdraw the skip back over the same path to the discharge point in the entry. The initial withdrawing pull on the tail rope causes the doors 8 and 9 at the head end 15 of the skip to close, thereby holding the load of coal in the skip as it is drawn out. These operations are repeated in successive cycles until all of the coal within reach of the skip as it travels about the platform has been loaded out. Then the platform is moved to a fresh position and the loading cycle repeated again. Various positional arrangements of the platform, skip and ropes for different mining operations are shown in Figs. 4–7. For the purpose of more fully explaining the operation and advantages of the apparatus, the guiding surface of the platform or guide member 10 may be considered as being divided into three working portions, to wit, a posterior approach or deflector guide portion $a$ between the points $z$—$z'$, located at the rear of the working side of the platform and in advance of the unloading or discharge point or station of the skip, an anterior bearing or load sustaining and guiding portion $a'$ located at the front of the platform between the points $z^2$—$z^3$ facing the loading point or station of the skip, and an intermediate transitional portion $a^2$ arranged between the points $z'$—$z^2$, which with the portion $a'$ constitutes the bearing portion of the platform and along which the skip travels to and fro between the points $z'$—$z^2$ and shifts its position into and out of concentric relation to the curved periphery of the platform, i. e., from a tangential position to a concentric position, and vice versa. In its forward and backward travel along the portion $a$ the skip during its loading course and initial portion of its conveying course moves through the mass of coal, during which it is fully backed by the portion $a$ and held from any other than a true movement in the arc of a circle. The pull in these movements of the skip is in each case in the direct line of pull of the rope 11 (65) or rope 11' (66), as the case may be, the portions of which connected with the skip are in such skip movements trained about and guided by the adjacent portions of the curved surface of the platform. During such movements of the skip, as shown in Fig. 4, the arms 17 and 18 of the draft connection extend across and beyond the inner bearing face of the skip with their rollered free ends disposed between such face of the skip and adjacent portion of the curved surface of the platform and in contact with the latter. These rollered ends of the arms thus coact with the rollers 87 on the skip to prevent frictional rubbing contact between the platform and skip and provide a bearing reducing friction, thus preventing wear and tear on the platform and skip and holding the skip out of direct contact with the platform and providing a space between the skip and platform to allow free shifting movements of the rollered ends of the arms and to receive and permit free shifting movements of the connecting ends of the ropes 11, 11' without injury thereto. On the second part of the skip's course of unloading travel in contact with the platform, namely, in its backward movement over portion $a^2$, the pull of the rope 11' on arm 18 causes the arms 17 and 18 to gradually and progressively move outward and rearward relative to the support and skip and inwardly of the latter, so that as the rear end of a skip reaches the point $z'$ and thereafter the skip assumes the position shown in Fig. 3 due to the outward pressure thereon of the arms 17 and 18 and the conjoint lateral swing of said arms and the skip on the turntable 19. The skip is thus shifted from a position concentric with the curved surface $a^2$ of the support to a position tangential to the portion $a$ thereof opposite which it lies and the arms 17 and 18 are disposed for travel on the curved portion $a$. As a result the skip will be held out of contact with the surface $a$ and disposed for straight line rearward travel to the positions shown in Fig. 2 and thence to the unloading point or station at which the coal may be discharged from its rear end. On the succeeding forward movement of the skip from the discharge station to the successive positions shown in Figs. 1 to 4 under the pull of the rope 11 the above-described movements of the skip and draft arms will be reversed, the skip moving forwardly on a straight line toward the surface $a$, the arm 18 then coming in contact with the surface $a$ and forcing the skip outward to the position shown in Fig. 3, during which, through relative pivotal motion between the skip and arms, the position of the arms will have been shifted to that shown in Fig. 3, and thereafter, as the arms engage and the skip approaches the surface $a^2$, the arms will assume the position shown in Fig. 4 and the skip will be brought into concentric relation to said surface $a^2$ for travel along the same and the surface $a$ for the succeeding loading action. It will be observed that in its travels toward and from the rear guiding or approach portion $a$ in its reciprocating movements the skip, in addition to swinging to a straight line position and tangential to the surface $a$, assumes a position in which it lies substantially axially in line with the surface $a^2$ and to a substantial degree inside the line of tangency at the point of greatest radius of the portion $a^2$, so that it is disposed axially in the line of pull of the draft ropes, allowing it to be moved with less drag resistance and with less power and less strain on the draft mechanism. It will further be noted that as the arms pivot and shift from the position shown in Fig. 1 to that in Fig. 4, the line of draft of the rope 11 with respect to the width of the skip shifts transversely of the skip from a substantially median line thereof to one extending along the inner bearing side 13 thereof. That is, when the skip is being pulled in a straight line toward the rear guiding or approach portion $a$ the pull of the rope is exerted substantially centrally or along the longitudinal axis of the skip and thereby the skip is caused to travel endwise in a straight line without any tendency to skew or be drawn more or less broadwide, thereby effecting the most efficient movement of the skip with least resistance (whether loaded or empty) over the mine floor. However, when the skip has shifted into concentric bearing relation with the curved surface $a^2$ and $a'$ of the support, the pull of the rope is applied at the inner forward corner of the skip and hence concentrically along and around the circular bearing surface. This circular pulling action along the inner concentric wall 13 of the skip is most efficient, avoiding any tendency to pull the skip radially inward or outward so as to cause it to kick or swing away from the circular bearing surface and thus prevent the desired true concentric movement of the skip about the support. Also, as a result of the compound guiding and shifting movements above described, shocks, jars and frictional rubbing contact between the skip and supporting platform are reduced to a great degree, as well as any tendencies of the skip to slam against the platform, so that the operation of the skip is facilitated and easy movements of the same in its travel about the platform insured.

This movement of the skip on a straight line, and on a line substantially parallel with its longitudinal axis, as it travels between the unloading point and the guiding surface $a$, may be for any distance in rear of said guiding surface. In practice, such distance should be equal at least in length to the length of the skip so that the skip may move for proper guiding actions in a tangential path toward and from the guiding surface. Between such distance point beyond the rear of the guiding surface and the unloading point the skip in its forward and rearward travel may move in a straight line, a curved line, or a partly straight and partly curved line, as required, during which it will be drawn longitudinally on a line substantially parallel with its axis in order to reduce drag resistance. In other words, the straight line tangential movement may be for any distance or for only that distance required for the described guiding actions, depending upon the layout of the mine.

Having thus preliminarily described the general arrangement and plan of use of the invention we shall now describe the various units of the apparatus in detail.

Skip constructions

A preferred form of skip construction is shown in Figs. 8, 9 and 10. The skip comprises a vertically disposed inner wall 50 which is arcuate throughout its length and concentric with the periphery wall 100 of the guiding platform 10. Said wall 50 of the skip is preferably formed of an integral sheet of metal and in thin seam mining practice will usually vary between 20'' and 30'' in height. The wall 50 may be reinforced by a plurality of longitudinally disposed ribs or flat bars 51 which extend throughout its length and project beyond the ends thereof to terminate in sharpened teeth or prongs 52. Below the lowermost rib 51 there is attached to the wall 50 a runner 53 comprising a longitudinally-disposed member curved to underlie the bottom edge of the wall and project inwardly therefrom to form a runner-like bearing for the skip and the parts associated with said wall.

The opposite or outer longitudinal wall 55 of the skip is of substantially the same construction as the inner wall 50, being curved on an arc concentric therewith and terminating on radial lines passing across the ends of the inner wall 52. The skip is entirely open at the bottom thereof and except for necessary connecting structure is also open across the top. Along the upper inside edge of the wall 50 there is fixed a channel 58, the flanges of which lie horizontally and extend inwardly of the skip, the upper flange being level with the top of the wall. A similar channel 59 is similarly disposed along the inner face of the top of wall 55. Said channels add to the longitudinal strength of the construction and also serve as trackways for the movement of the arm-carrying platforms of the draft connections or shifters hereinafter described.

The skip is laterally tied together at either end by radially-disposed cross members 60 and 61 which are flanged at their edges to provide guards protecting the interior mechanism adjacent the top of the skip from direct contact with coal. The ends of said members 60 and 61 are seated and fixed in the grooves of the channels 58 and 59. Another pair of cross members is provided centrally of the top of the skip, comprising the cross-bar or channel 62 which is disposed parallel to the end member 60, its inner end being seated in the channel 58 at the center thereof and extending across to be fixed at its outer end in the opposite channel 59. Similarly the cross-arm 63 extends from the center of channel 58 outwardly and parallel to the end member 61 to be similarly seated in the opposite channel 59. The construction just described therefore provides a parti-cylindrical skip structure having arcuate longitudinal side walls, a completely open bottom and fixed connecting cross-members at the top thereof comprising the members 60, 61, 62 and 63.

In accordance with the invention draft connections and shifters carrying divergent angularly movable arms are provided for guarding and easing the skip into bearing engagement with the circular platform and for connecting the skip to the head and tail ropes for effecting controlled movement thereof. As shown in Fig. 8, the left hand end of the skip will be considered the head end, the pulling or head rope 65 being considered as exerting pull in the direction indicated by the arrow. As shown in this embodiment, a draft connection is provided at the head end which comprises the round bar member 70 which extends horizontally across the top of the skip and which bends at right angles to project downwardly at 71. The horizontal portion 70 of said head arm is fixed to a rotatable bearing plate 73 mounted on the top of a longitudinally movable horizontal carriage plate 74 which extends across the top of the skip. The end of said arm 70 is fastened to the top of bearing plate or turntable 73 by a U-shaped clamp 75 bolted thereto and by a similar clamp 76 at the opposite side of said turntable. The turntable 73 is mounted for rotary movement in the carriage 74, a circular recess 76 being formed in the top of said carriage plate for journaling the turntable 73 therein while an annular flange or guard plate 77 is bolted to the carriage plate to overlie the annular bearing lip or flange 78 on the turntable.

A shorter arm 80, generally similar to the arm 70 and having a vertically depending end portion 81, is fixed to turn with the arm 70 on the turntable 73 while remaining in a fixed divergent angular relation to said arm 70. The end of the horizontal arm 80 is welded to the side of arm 70 at the center of the turntable 73 and is also held by a continuation of the clamp 76 near the periphery of said turntable.

The assembly of the divergent arms 70 and 80 and turntable 73 is all mounted as shown in the carriage plate 74 which in turn is horizontally movable for a limited distance along the top of the skip. For this purpose the carriage plate 74 comprises a generally flat rectangular plate having arcuate ends 82 and 83 which are loosely mounted in the side channels 58 and 59 respectively so as to be slidable therealong. Rolling bearing is provided between the carriage plate 74 and the channels 58 and 59 and as shown horizontally rotatable wheels or rollers 84 are mounted to turn on pins projecting upwardly from the top surface of the plate 74 to bear against the adjacent smooth edges of the flanges of the channels 58 and 59. Similar rollers 85 are provided at the underface of the carriage plate 74 to cooperate similarly with the edges of the lower flanges of said channels. As will be clear from Fig. 8 the movement of the carriage 74 along the top of the skip is limited in one direction by the end member 61, while the median cross member 63 provides a similar stop in the opposite direction. In order to cushion movement of the carriage 74 against the impact on cross member 63, a leaf spring 63a is fixed along the adjacent edge of said cross member. A similar spring 62a may be fixed along the corresponding edge of the cross member 62.

As will be clear from Fig. 8, an arm-supporting carriage 110, similar to carriage 74, for supporting another draft connection having a pair of arms 111 and 112 is provided at the opposite or tail end of the skip. The construction and operative movements of said arms 111 and 112 are identical with those of the arms 70 and 80 previously described but in the opposite sense and consequently a detailed description thereof need not be given. Tail rope 68 is attached to arm 111.

Means are provided for spacing the inner wall 50 of the skip from the periphery of the guiding platform when the skip is in concentric relation thereto and also for providing rotary bearing engagement between the skip and said platform. For this purpose the lower peripheral web or vertical wall 101 of said platform is adapted to be engaged by rollers 87 which are spaced from the inner wall 50 of the skip by suitable horizontal brackets 88. As shown there are two of said rollers 87 equally spaced in from the ends of the inner wall 50 and preferably about centrally of the carriage plate 74 and 110, in their respective end positions. Spacing and bearing contact for the upper guiding wall 100 is provided by horizontally rotatable rollers 90 which are mounted near the lower ends of the depending parts 71 and 81 of the arms 70 and 80. Said rollers are freely rotatable on reduced shank 91 of arm 71 and shank 92 of arm 81. On the latter arm the roller 90 is held in position by a lock nut and washer 93 on the lower end of said arm.

The shank 91 of arm 71 is extended farther downward to provide support for a bracket 95 which is pivotally mounted thereon and the lower portion of said bracket bears against a nut 96 on the end of the shank 91. The roller 90, as shown, is supported from below by the top of said bracket 95. The bracket 95 provides support for one end of a coil spring 97, the opposite end of which is attached to the end of the head rope 65 by means of an intervening slidable block 98. A sheath 99 is formed by two channels fixed in the end of bracket 95 to provide protection for the spring 97 and bearing support for the block 98. Additional rolling engagement with respect to the periphery of the guiding platform is provided for said spring assembly by an upper roller 102 which bears against the wall 100 of the platform and by a lower roller 103 which bears against wall 101 thereof. Said rollers are suitably mounted for horizontal rotation on the upper and lower ends respectively of the vertically-disposed shaft 104 at the end of the sheath 99. A guide sheave 105 is rotatably mounted on said shaft within the end of the sheath 99.

Means are provided for causing the carriages 74 and 110 to move together throughout their range of movements on the skip. For this purpose longitudinally-disposed parallel strips or bars 115 and 116 are pivotally connected to the carriages at their ends, said connections being to the undersides of said carriages. Thus when pull is imparted to the carriage 74 to move same in the direction of the head rope it will pull the carriage 110 with it until it abuts against the face of the cross-member 62. Correspondingly when tension is applied to the tail rope and released on the head rope, the carriage 110 will move to the opposite end member 69 of the skip drawing carriage 74 with it and into contact with the cross member 63.

In accordance with one feature of the invention the skip is provided with doors at its head end, which doors are adapted to stay open and lie parallel to the side walls of the skip during the movements of entering into and loading the shot-down coal but which on the reverse or returning conveying movement are designed to close and hold in the coal which has been loaded into the skip. In the form shown in Figs. 8 and 9 said doors comprise a plate 120 which, when the doors are open, is parallel and adjacent to inner side wall 50; and opposite door plate 121 which is similarly positioned with respect to outer side wall 55. Each of the doors is similarly constructed and the construction of door 120 will be described in detail. Said door is provided with longitudinal strengthening ribs 122 which at the inner or hinged end of the door are bent around between the door and the wall 50 to form sleeves 123 for the vertical hinge pin 124. Said hinge pin is also threaded through hinge sleeve members 125 which are fixed to the inner face of the wall 50 so that the inner edge of said door is hinged about the vertical axis of the hinge pin 124. It will be clear that the hinge construction of the opposite door 121 is substantially identical.

Means are provided for causing said doors to be held in their open positions as shown, i. e. parallel to the walls 50 and 55 of the skip when the skip is loaded by being drawn into the coal by the action of the head rope and the guiding platform. Upon reverse movement of the skip through the pull of the tail rope said doors are designed (through cooperation of the movement of the carriage 74) to be drawn to their closed or joining positions. For this purpose pivoted links 130 connect each door to the carriage 74. Each of said links is pivotally attached at one end to the inwardly-extending top flange member 131 on the door, while the opposite end is pivotally attached to the bottom of plate 74 by a bolt or pin 132. It will thus be clear that when the carriage 74 is moved from the position shown in Fig. 8 to the opposite end of its possible travel movement, the doors 120 and 121 will be turned on their hinges so as to bring their free edges together and thus close the corresponding end of the skip.

According to one feature of the invention the skip is preferably reversible so that either end thereof may act as the head end to be drawn or sumped into the pile of shot-down coal. Thus while in Fig. 8 the left-hand end of the skip acts as the head end when the skip is drawn counter-clockwise about the guiding platform, the construction is such that the head rope may be attached to the arm 111 at the opposite end so as to draw the skip clockwise into a pile of coal as shown diagrammatically in Fig. 5 for example. In this case, of course, the rope attached to the arm 70 would become the tail rope.

In order to afford complete reversibility of the skip, it is provided with sets of doors at either end, the doors 140 and 141 corresponding to the doors 120 and 121 respectively at the opposite end of the skip. When the right-hand end of the skip (Fig. 8) is to act as the tail end thereof it is desirable to hold the doors 140 and 141 fixed in their open positions parallel to the walls of the skip. For that purpose a cross bar or locking member 142 is connected to the free end of each door 140 and 141, preferably by the top flanges 131 thereof, said bar extending across the skip just beneath the cross member 60 and thereby serving to hold the doors blocked open. Said bar 142 is removable from the doors when it is desired to render same movable when the operations of the skip are reversed, and for that purpose the bar 142 may be attached to the flanges 131 by removable bolts or other suitable means. It will also be noted that the flanges 131 are provided with pin holes 145 for the attachment thereto of the pivoted door-actuating links 130 when said doors 140 and 141 are to be rendered active. When that is done the links are removed from the doors 120 and 121 and attached to the other set of doors 140 and 141 and to the carriage 110, while the locking bar 142 is attached to hold open the doors 120 and 121.

As hereinafter explained in connection with the operation of the ramp and associated guiding frame (Fig. 23), whenever the skip is in bearing contact with the guiding platform, all of the arms 70, 80, 111 and 112 will be positioned to hang over the inner side 50 of the skip and thereby to interpose their rollers 90 between the skip and the periphery of the guiding platform. Thus the arms afford spaced-bearing means, in addition to the fixed bearing rollers 87, between the skip and the platform. Also this arrangement assures that the arms will always be held away from the open ends of the skip whenever same is being moved into the pile of coal for loading, thereby automatically clearing the entering mouth of the skip and also preventing any jamming or damage to the arms and their mechanism.

The rear or tail set of arms 111 and 112 are preliminarily positioned to hang over the inner side of the skip by the action of the arm-positioning mechanism at the unloading ramp as will be hereinafter described. It will be clear, however, that once so positioned, the arms will necessarily remain there so long as the skip continues to be drawn in the head direction by the head rope. That is, the arm 111 cannot swing outwardly around the corner 52 of the skip (Fig. 8) so long as the platform 110 is retracted in the position shown in Fig. 8. Thus there is no tendency for the idle or rear set of arms to swing into the ropes or path of movement of the skip until the reverse direction is imparted to the skip.

Certain modifications of skip construction are shown in Figs. 11, 12 and 13. These modifications relate principally to the mechanical construction and arrangements of the arm-supporting carriages and the interconnection of said carriages with each other. In general respects the construction of the skip itself is substantially the same as the form of Figs. 8 and 9 and equivalent parts are given the same reference numerals where they apply and will not be redescribed here. The connecting cross members 162 and 163 are substantially the same as the corresponding members 62 and 63 of Fig. 8 but in the modification are shown spaced apart at their convergent ends, while additional bracing at the outer side 55 of the skip may be afforded by triangular fish plates 165 which underlie the channels forming the arms 162 and 163 and extend to the outer side wall 55.

The construction of the end doors 120, 121, 140 and 141 is substantially the same as in the form of Fig. 8 and the equivalent parts there are also similarly numbered. In Fig. 11 there is shown an inner wall member 170 which extends parallel to the inner wall 50 and spaced therefrom, between the hinges of the doors at either end of the skip. Said walls thus provide additional strength and continuity for the inner wall surface between the doors. A similar wall 171 is provided along the outer wall 55 between the hinges of the doors 121 and 141.

Referring now to the construction of the pivoted arms, same are shown as formed of channel material. The head end arm 180, corresponding to arm 70 of Fig. 8, extends horizontally from the top of the skip and is provided with a depending portion 181 which is also formed of channel material. The elbow of the arm is formed by angle brackets 182 and 183. At the lower end of arm 181 there is mounted a depending shank 184 of round stock, same being properly spaced and attached to the arm 189 by spacing collars 185. The lower portion of shank 184 supports the rotatable roller 186 which runs against the upper trackway or wall 100 of the guiding platform. Said shank is continued downward to provide pivotal attachment for the clamp 187 of the head rope 65. Said clamp is clipped about a rotatable sleeve 188 at the lower end of shank 184 which lies between the roller 186 and the clamp, the lower end thereof being supported by nut and washer 189 on the lower threaded end of the shank. The divergent inner arm 190, which corresponds to the arm 80 of Fig. 8, is constructed in a form similar to that of arm 180 but its depending portion 191 terminates with the roller 186 as the cable or rope is not attached thereto.

In this modification the arms 180 and 190 are rotatable together with a turntable 195 which is rotatably supported on the movable carriage 200. In the construction shown the bottom surfaces of the arms 180 and 190 are welded to the top surface of the turntable plate 195. The bottom surface of said turntable is movable over the top surface of the carriage plate 200. Rotatable thrust-bearing connection is provided between the turntable 195 and the carriage plate 200 by means of rollers 196 which turn about pins 197 which depend from the under-face of plate 195. Said rollers are arranged in a circle spaced from the periphery of the turntable 195 and bear against the circumference of a circular opening 198 which is cut in the carriage plate 200. Bearing washers 199 are fixed to the lower ends of the pins 197 to support the rollers 196 and to partially underlie the under-face of the plate 200.

The embodied means for providing horizontal movement of the carriage 200 with respect to the side walls of the skip comprises four grooved rollers 201 which are rotatably mounted on studs 202 depending from the underside of the trapezoidal plate 200 adjacent each of the four corners thereof. Said grooved rollers are adapted to engage and travel along tracks formed by the round bars 203 and 204 which extend along the inner and outer sides respectively of the skip near the top thereof and spaced inwardly from the side walls thereof as shown in Fig. 13.

The left-hand pair of divergent arms 189, 190 and the right-hand pair 211 and 212 (Fig. 11) may be interconnected by means such as the spiral spring 215 which tends to urge them to the inner or platform-engaging position of Fig. 11. The ends of said spring are attached to the arms 190 and 212 so that any force tending to pull the arms away from the position shown in Fig. 11 will be resisted by the spring. This construction thus tends to insure that the arms will normally clear the mouths or ends of the skip and also it performs a function in connection with the unloading action of the skip on the ramp as hereinafter described.

Another modified form of skip construction is shown in Figs. 14, 15 and 16. The principal features of difference provided therein are first, devices whereby a single pair of divergent arms may be used in connection with a reversible skip, so that said arms serve to advance the skip for loading in either direction and also are used in connection with the tail rope for the retreating movement of the skip in either direction; and second, means for varying the capacity of the skip by varying the overall height thereof.

It will be recognized that the general construction of the skip in so far as the side walls and bottom structure are concerned is generally the same as the skip shown in Figs. 11, 12 and 13, while the travelling carriage for supporting the single pair of arms is similarly constructed and mounted with respect to the walls of the skip. Accordingly only those features which differ materially from either of the forms of skips hereinabove described will be referred to in detail.

The side walls of the skip are formed for telescoping extension vertically to adapt the skip to coal seams of different depths. Accordingly, the inner side wall thereof comprises the lower arcuate plate 220 to the lower edge of which is attached the inwardly-curved runner 221. The upper portion of said wall plate 220 is perforated to provide a plurality of horizontal rows of openings for bolts 222 and 223. These bolts are adapted to fit into corresponding openings in the lower portion of the overlapping upper wall member 224 which extends vertically to the top of the skip and is thence curved inwardly at 225 to form the partly covered top portion of the inner side of the skip. Specifically the height of the skip can be increased by increments equal to the distance between the rows of bolts 222 and 223 by raising the upper plate 224 so that its lower row of holes is parallel to the upper row in the lower plate and then bolting the two plates together at that level. As shown in Fig. 15, several such telescoping vertical variations in height are possible with the four rows of all bolt holes in each section of the wall of the skip. As will be obvious from the drawings the opposite side of the skip 226 is similarly constructed.

Transverse connection of the side walls is effected at the ends thereof by fixed cross members 227 and 227' both of which are flanged to have a downwardly projecting lip across the ends of mouths of the skip. Each end of the skip is provided with a pair of doors 228 and 229 which are constructed and attached to the walls of the skip in manner similar to those in the forms hereinbefore described. A central transverse tie between the side walls is provided by the U-shaped connecting frame 230 which is attached to both walls and extends across the skip below the top thereof at about its central section. One set of divergent arms 180 and 190 are provided at the left-hand end portion of the skip and it will be clear that same are constructed in substantially the same form as the similarly-numbered arms in the form of Fig. 11. Said arms are fixed to turn with a turntable 195 at the top of the skip and said turntable is seated upon and travels with a carriage 200. The construction of these latter-named parts is substantially the same as those similarly numbered in the form of Figs. Nos. 11 to 13. Rollers 201 on said carriage are designed to travel along round bar tracks 203 and 204 at the outer and inner sides respectively of the skip. Said tracks are supported on vertical webs 205, the lower edges of which rest on the top of the transverse member 230 and against the inner faces of the top wall members 225. Thus it will be clear that the carriage 200 is designed to travel along the arc of the skip at the top thereof in a manner similar to that of the carriage 200 in the form of Fig. 11, but for a considerably greater distance.

In the skip of Figs. 14-16 the single pair of arms 180—190 are designed to perform all the functions of the double sets of arms on the other forms of skips. In particular this single set of arms is constructed so as to effect the closing of the doors at the entering end of the skip after the load of coal has been taken on, regardless of whether the skip is used to load in a clockwise or counter-clockwise direction about the guiding platform. In the position shown in Fig. 14 the skip is assumed to be loading by counter-clockwise movement under tension of the head rope 65 and in that position the carriage 200 is held against the inner side of cross member 227 by such tension during the loading operation. When the loading is completed and it is desired to withdraw the skip by clockwise movement, tension is relaxed on the head rope 65 and applied to the tail rope 66. Thereupon the pair of arms 180—190 and their carriage 200 are caused to travel from the left-hand to the right-hand end of the skip along the arcuate top thereof until the right-hand edge of the carriage 200 comes into contact with the left-hand edge 235 of the cross member 227'. It will be noted that springs 236 are provided between said members 227' and 235, the latter being supported by the springs so that impact of the carriage 200 thereagainst will be cushioned. A similar set of springs is provided at the opposite end of the skip.

The embodied means for closing the doors 228 and 229 at the left-hand end of the skip is so designed that closure of the doors will not occur until shortly before the carriage reaches the end of its clockwise arcuate movement at the right-hand end of the skip as just described. For this purpose a slidable arcuate bar or plate 240 is mounted centrally of the top of the skip just above the top of the U-shaped transverse member 230. A flanged transverse end member 241 is provided at the right-hand end of said bar extending across the skip below the top plates 225, and a similar cross member 242 is provided at the opposite left-hand end of said bar. A relatively short transverse member 243 is mounted across the lower face of bar 240 near the left-hand end thereof so that in the position shown in Fig. 14 it underlies the turntable 195 and door-actuating links 244 and 245 are pivotally connected to the ends of said bar.

When the carriage 200 and arms 180, 190 are pulled to the right-hand end of the skip, the right-hand edge of the carriage 200 encounters the upstanding flange on the cross member 241 a short distance before the end of the travel of said carriage. It then moves with it the member 241 and therewith the arcuate bar 240. This motion causes the cross member 243 to operate the door-closing links at the left-hand end of the skip so that said doors are closed shortly before the arms reach the end of their travel.

This arrangement makes it possible to close the doors at either end of the skip by movement of the carriage while still permitting the carriage to travel the length of the skip so as to function at either end thereof in either direction of skip movement. It will be understood that the skip shown in Fig. 14 is reversible so as to load in the clockwise direction. When that is done the cross member 246 near the right-hand end of the bar 240 will be connected by links 244 and 245 to the right-hand pair of doors. The door-locking removable cross member 247 will be removed from said right-hand set of doors and will be transferred to block open the left-hand set of doors in the manner described in connection with the previously described forms of skips.

*Skip-guiding and bearing platform.*

The second principal unit comprising the invention is the circular, self-contained skip-guiding and bearing platform. The detailed construction of one preferred embodiment thereof is shown in Figs. 17 and 18. The principal requirements of its construction are first, the ability to present a smooth, uniform circular bearing surface for the contact therewith of the skip while acting as a supporting guide or sheave for the skip-controlling ropes or cables; and second, the provision of self-contained means for holding the platform in stable position during loading operations together with means for providing virtually unlimited mobility of the platform in any desired direction along and across the mine floor in order to move it from one loading position to another.

As previously stated the shape and dimensions of the platform are such that it and the skip cooperating with it never occupy more than a minimum area regardless of their relative positions during loading. That area is always defined by the diameter of the platform plus the radial width of the skip when they are in concentric contact. Moreover the shape and construction of the platform is such that it is capable of cooperating with the skip for loading operations regardless of the location of the platform with respect to the rope lines. These advantageous characteristics are largely the result of the entirely circular construction of the platform and the arcuate concentric shape of the skip which cooperates therewith.

Referring to Figs. 17 and 18 the platform is essentially a shallow cylinder in which the upper cylindrical wall section 100 (forming the upper bearing surface for the skip arm rollers 90 (Fig. 9)) is rigidily supported above and concentric with the similar lower cylindrical bearing wall member 101 with which the skip rollers 87 cooperate. The upper and lower bearing cylinders 100 and 101 are separated and the gap between them is occupied by a plurality of rope supporting and guiding sheaves or rollers 300. Said rollers are mounted on vertical axle pins 301, which are journaled above in the annular strengthening flange 302 of the cylinder 100 and below in the equivalent flange 303 of the cylinder 101. As will be clear from the drawings these rollers or sheaves 300 provide rolling and guiding support for either the head or tail rope or both when same are under tension from their respective operating drums and said sheaves continue to so function when the skip is concentric with and bearing against the platform as shown in Fig. 8 for example.

In order to facilitate handling of the platform in non-operating conditions such as bringing it into and out of the mine and originally setting it up in position, said platform is divided generally into three separable units or sections. As embodied, these sections comprise the relatively long and narrow central frame portion constituting the two parallel I-beams 305 and 306. At one end said I-beams are rigidly joined by horizontal web 308 which is provided with a vertical arcuate flange 309, constituting a continuation of the bearing surfaces 100 and 101 of the other segments of the platform. The lower portion of said flange 309 is also provided with a horizontally-projecting lipped flange 310, corresponding to the bottom guard plate of the remainder of the platform. Similar flanges 309 and 310 are also provided at the opposite end of the central I-beam frame. The central frame, comprising the two I-beams, constitutes the major interlocking structure for the entire platform and other features of said frame will be hereinafter described. The other two principal sections of the platform comprise the similar left-hand and right-hand segments of the total platform cylinder, and said segments are substantially similar in construction. Considering the left-hand segment, same comprises the arcuate bearing members 100 and 101 and the bottom plate 315 which is of similar segmental outline, underlying and being fixed to the bottom of the I-beam 305 and extending horizontally to underlie the bottom edge of the arcuate bearing wall 101. Said bearing wall is not fixed to the bottom plate but lies closely against it. The bottom plate 315 projects radially a short distance beyond the periphery of the wall 101 and is there provided with a slightly upturned lip 316 which constitutes a guard against coal and grit moving onto the plate 315 and between same and said wall 101. The opposite or right-hand segment of the platform is provided with a similar underlying bottom plate 315.

It will thus be clear that the walls 100 and 101 of the two major segments of the platform, together with the end walls 309 of the central frame, provide a continuous cylindrical vertical bearing surface throughout the entire periphery of the platform.

Means are provided for rigidly locking the cylindrical platform at any desired locus on the mine floor so that same will be held substantially immovable during the stresses and impact of the loading operations which take place about it. In the present embodiment this is preferably done by means of jacks contained within the platform cylinder itself and adapted to brace and lock same against the mine floor at the bottom and the mine roof at the top. Said jacks are also designed to cooperate in the locomotion of the cylindrical platform over the mine floor. As embodied, one jack 320 is fixed to the central framework of the platform at one end thereof. The bottom plate 321 of said jack is bolted to the top flanges of the I-beams 305 and 306 near the ends thereof. Said column is a hollow cylinder housing a slidable plunger 323, to the top of which is fixed a rectangular corrugated roof-engaging platform 324. Preferably said platform is attached to the upper end of the plunger by a universal or ball joint which permits the platform to accommodate itself to irregularities in the mine roof. The detailed construction of said jack is not shown and in accordance with the invention it may be an hydraulic, mechanical, pneumatic or electrically-operated mechanism. We have found that hydraulic jacks are preferable for many reasons and in so far as the details of construction are shown the jack 320 is intended to represent a hydraulic jack.

A second hydraulic jack is mounted for movement relative to the central I-beam frame and as shown comprises the hollow fluid column 330 with the plunger 331 slidable therein. The top roof-engaging plate 332 is preferably also provided with a ball-and-socket connection 333 to the top of the plunger together with a yoke 334 locking it against angular rotation horizontally. The lower end of the jack is provided with a bottom floor-engaging plate 335 which has a ball-and-socket bearing connection 336 with the bottom of the fluid column 330. The port 337 for introducing the fluid 338 into said column is also shown.

Said second jack is mounted for horizontal movement along the I-beams 305 and 306 and for that purpose the lower end of the fluid column 330 is housed in a sleeve 338 which is supported on four laterally projecting axles 339. Conical rollers 340 are mounted on the ends of each of said axles and said rollers are received between the contiguous flanges of the I-beams 305 and 306. Thus when the jack 330 is disengaged from the roof and floor it is capable of longitudinal horizontal movement along the I-beam frame.

Means are provided for imparting such movement to the jack 330 when it is so disengaged, and on the other hand for imparting equivalent locomotion to the cylindrical guiding platform itself relative to the jack 330 when said jack is engaged. As embodied the sleeve 338 of jack 330 is connected to a horizontal platform 345 which extends laterally above the I-beams. A relatively long, screw-threaded rod 346 extends along the top of I-beam 306, having one end rotatably journaled in the end plate 308 and the other in a similar connecting cross plate 347 which is positioned just inside the bottom plate of the jack 320. Means for imparting rotary movement to said screw rod 346 comprises a motor 350 mounted on the bottom plate 315 and drivingly connected to the screw rod 346 by suitable worm gear reduction 351. The screw rod has threaded connection with the jack platform 345 by means of ears 350′ which extend forwardly from said platform and are threaded to surround and engage the screw rod.

It will thus be clear that when the jack 320 is disengaged from the mine roof and the jack 330 is engaged therewith, that the entire cylindrical guiding platform is movable with respect to said jack 330. Such movement is effected by means of the motor 350 which turns the screw and thereby causes the screw and the entire cylindrical platform to travel in the desired direction backward or forward with respect to the fixed jack. The limit of such movement is the space between the inner edge A of the cross piece 347 and the inner edge B of the jack platform 345 when the outer edge of the latter is in contact with the cross piece 308, thereby permitting a linear movement A—B of the cylindrical platform for about ¾ of its diameter for one setting of the jack 330.

The same mechanism may be used to move the jack 330 with respect to the cylindrical platform when the jack 320 is fixed and the jack 330 disengaged. In that case actuation of the screw rod by the motor causes the jack 330 and its platform 345 to be drawn toward or away from fixed jack 320 for the same length of movement A—B previously described. Thus by alternately setting and releasing the two jacks the cylindrical platform can be advanced or retracted along the axis of the central I-beam frame in steps equal to the distance A—B between the two jacks.

The invention also provides for rotational movement of the cylindrical platform so that it may be turned through any horizontal angle and thereby establish the direction to be followed by the linear locomotion previously described. For this purpose a worm wheel 355 is splined to the exterior of the fluid column 330 so as to permit limited vertical movement of said column with respect to the worm wheel. Said worm wheel is adapted to be driven by suitable gearing 356 from a motor 357 mounted on the laterally-extending portion of the platform 345. Assuming the jack 330 to be fixed against the mine roof, the splined wheel 355 will be held from rotation. Driving movement of the motor will therefore cause the motor and its gearing, and therewith the entire structure of the cylindrical platform including the base plate 315 and the central I-beam frame, to rotate about the jack 330 as a pivot to any angular position desired and in either direction depending upon the sense of turning of the reversible motor 357. It will further be understood that such rotary movement will be imparted to the platform regardless of whether the jack is concentric or eccentric with respect to the platform. That is, the jack may be located at any point in its path of relative movement along the screw rod 346. Consequently any desired angular movement may be imparted to the frame.

Means are also embodied in the guiding platform for taking up a part of the shock of the impact which occurs when the skip strikes the curved bearing surface of the platform as in approaching same for loading (Figs. 2 and 3). As previously described, we have found that the spring 97 (Figs. 8 and 9) on the head rope is one practical way of taking up such shock and ordinarily in practice the provisions of such a spring on the head rope is sufficient. However, resilient means may also be embodied in the loading platform itself for that purpose and same may be used in lieu of the spring on the head rope or in combination therewith.

As embodied the two lateral segments of the cylindrical platform are constructed to have limited resilient sliding movement over the fixed horizontal base plate 315 and also with respect to the fixed central I-beam frame. For this purpose the two curved bearing plates 100 and 101 and the intermediate rope sheaves 300 in either lateral segment are adapted to move together as a unit with respect to the base plate 315 and the I-beam frame. For this purpose each of the segmental side units is provided with a pair of transverse frame members 360 and 361 which lie above the base plate 315 and are slidable relative thereto. Longitudinal inverted channel members 362 are connected to the ends of said cross members 360 and 361 so as to lie slidably on the base plate and against the lower flange of the I-beam 306. A flanged guiding member 363 is fixed to the top of the longitudinal member 362 and engages with the underside of the top flange of the I-beam. A shorter longitudinal member 364 also rests slidably on the base plate and is movable within U-shaped brackets 365 and 366, the feet of which are fixed to said base plate. Thus the lower bearing member 101 and its strengthening frame, comprising members 360, 361, 362 and 364, are all longitudinally slidable over the base plate 317. Identical construction is provided with respect to the left-hand segment slidable on base plate 315.

Means are provided for tying in to the slidable segment the upper part of the bearing frame comprising the arcuate member 100. As shown, a pair of inclined supporting brackets 370 and 371 are attached at their bases to the sides of the transverse pieces 360 and 361 respectively. The upper ends of said inclined braces extend horizontally to overlie the flange 302 of member 100 and are suitably fixed thereto.

The embodied means for resiliently limiting the longitudinal sliding movement of said segment and its associated supporting and guiding members comprises a spiral spring 375 which has one end fixed by hook 376 to the frame member 360 of the slidable segment. Its opposite end 377 is fixed to the immovable base plate 315 by means of a bracket 378 which is bolted to said base plate. Consequently any impact imparted to the surface of the cylindrical guiding member by movement of the skip, as shown in Figs. 2 and 3, causes the segment which receives that impact to slide over the base plate and thereby stretch the spring 375, thus cushioning said impact and preventing serious shock to the skip or the loading platform. Naturally such sliding movement will be slight and well within the limits of the distance between the rim of the segment and the upturned rib 316 of the base plate.

In accordance with one feature of the invention the controls for operating the motors 350 and 357 and the jacks 320 and 330 on the guiding platform are preferably located at a point remote from said platform and the power supply means from said controls to the several powered units on the platform are in flexible and extensible form so that the control unit may be located wherever desired relative to the platform and the other equipment being used in the loading and mining operations. As shown in Figs. 19 and 20, electrical cables are connected to both motors on the platform, while suitable fluid conduits 380 and 381 are connected to the jacks 320 and 330 respectively. Said conduits and cables are directed from the guiding platform to a control station which comprises the platform 385 having runners 386 on the bottom thereof for movability over the mine floor. The platform provides space for an operator to stand and at its front is provided with an upstanding control box 387 having switch handles 388 for the operation of the motor cable switches and handles 389 for the actuation of the hydraulic jack units. Electrical power lines 390 are preferably connected to the control unit as shown. It will be understood that different forms of power supply for the jacks and/or motors may be provided, such as compressed air, and that in such cases the compressor means may be remote from the control unit and the compressed air supplied thereto by suitable conduits or, in another proposed form, the air compressor may be mounted on the platform and the electrical power be supplied thereto or a power generator in a form of a combustion motor may in some cases be mounted on the platform itself. In any such case it will be understood that the control unit 385 is located remote from the guiding platform and is flexibly attached thereto by extensible power supply conduits.

One preferred means of connection between the guiding platform and the power control unit 385 is shown in the drawings. In this form the electrical cables and the fluid conduits are led upwardly from the unit 385 to lie along the mine roof and are gathered into a sheath 395 for that purpose. Means for holding said sheath adjacent the mine roof while permitting angular movement of the control unit 385 about the guiding platform comprises a yoke member 396, the narrow end of which is pivotally connected to one end of the sheath 395 while the spaced arms thereof are provided with inwardly projecting pin members 397. Said pin members engage holes provided in rotatable collar 399 with vertical thrust through its hub 398 disposed downwardly against the stop collar 398'. Spiral springs 400 cause the yoke to grip said collar tightly and to stay at any vertical angle in which it may be set. Thus the control platform 385 may be positioned at various places with respect to the guiding platform both angularly and longitudinally. For the latter purpose a substantial slack is provided in the cables and conduits so that the radial distance of the control platform from the guiding platform may be increased or diminished as indicated in Fig. 20. If desired drums or the like (not shown) may be mounted on the platform to handle the slack.

In order to provide proper directional guidance of the head and tail ropes of the skip in any and all positions of use while maintaining the desired spacing and parallelism of said ropes between the mining face and the loading ramp at the entry, it is necessary to provide some supplementary rope-guiding means in certain positions of the guiding platform. Said supplementary rope-guiding means are also adapted to control and guide the movement of the skip, whether loaded or unloaded, about turns in its course between the ramp at the entry and the circular platform at the loading and mining face.

Figure 21:
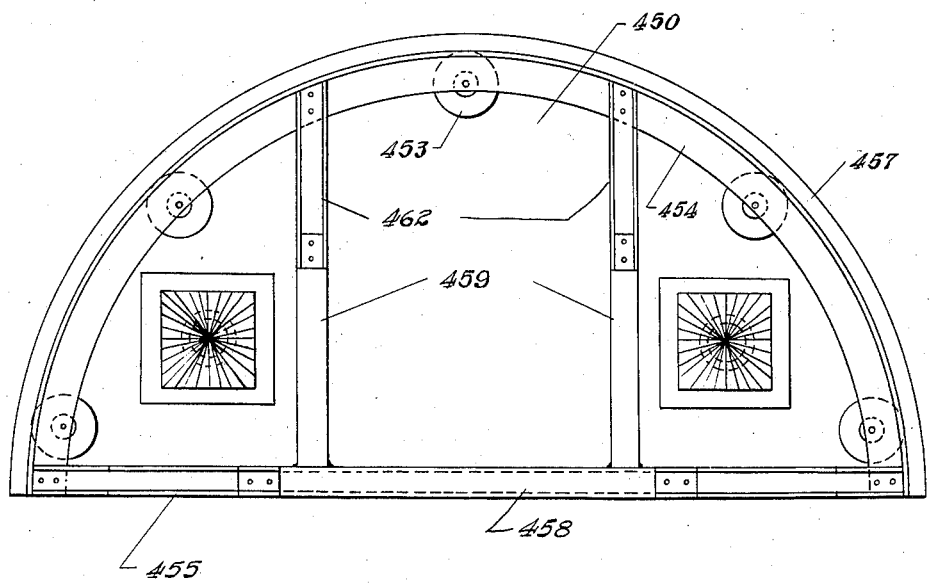
Fig. 21 is a top plan view of a semi-circular skip and rope guiding means used with the invention.
Figure 22:
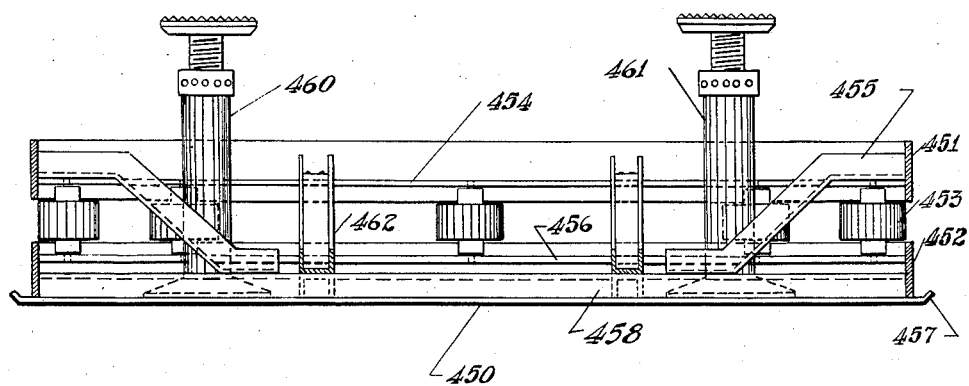
Fig. 22 is a side elevation of the mechanism shown in Fig. 21.

For this purpose we preferably provide a relatively simple structure which is semi-circular in form and roughly equivalent to one-half the structure of the circular guiding platform hereinbefore described. Said semi-circular rope and skip guide is generally indicated by the numeral 450 in the diagrammatic Figs. 5, 6 and 7 and is shown in detail in Figs. 21 and 22. The constructional similarity thereof to the circular platform will be readily seen. Said semi-circular guide 450 thus comprises the upper semi-circular guiding wall 451 and the spaced lower guiding wall 452 between which are mounted a plurality of rope-guiding sheaves 453. The upper semi-circular wall 451 and its strengthening flange 454 are supported by angled brackets 455 rigidly fixed to a diametral strengthening beam 458 extending across the straight side of the structure, and to the two attached transverse strengthening ribs 459 which extend along the base plate 450. Angle brackets 462 extend upwardly from the ribs 459 to support the upper wall 451. A pair of jacks 460 and 461 are mounted on the base plate 450 as shown and serve to fix the unit in position against the mine roof. Due to the infrequency with which this unit needs to be moved from place to place, said jacks preferably are simple mechanical units which may be operated by hand, although, if desired, they may be of the type disclosed in connection with the structure of Figs. 17 and 18. Due to the relatively low weight and small size of the unit 450 no special means need be provided for its locomotion.

*Unloading ramp*

In accordance with the invention means are provided for substantially automatically depositing the coal in the entry and delivering same into a car or other receptacle there provided. A preferred form of this construction is shown in Figs. 23 and 24. As embodied the entry having the elevated roof portion E is provided with the conventional trackway 500 on which mine cars 501 are adapted to travel. The drums and power means for the head and tail ropes 65 and 66 are also preferably located in the entry and as shown comprise an electrical motor 502 mounted on a platform and coupled to wind and release head rope drum 503 and tail rope drum 504 as required. The conventional mechanism for clutching and declutching either drum from the drive and for braking same is also embodied and not shown in detail. Elevated sheaves 505 and 506 to dispose the two ropes at the required angle for pulling the skip onto the ramp are mounted on a platform 507 in the entry as shown.

A ramp comprising the inclined plate 510 and supporting platform 511 is positioned in the entry for receiving the loaded skip as it is drawn from the room face. The loaded skip is drawn onto the ramp, there to deposit its load of coal and be withdrawn from same by return movement in the reverse direction. The elevated end of the ramp overhangs the mine car 501 so that the accumulated coal on the ramp is progressively forced from the overhanging edge thereof to fall into the car below. The lower and upper edges of the ramp are unobstructed by the side edges thereof and provided with upstanding walls 512 and 513 so as to confine the coal laterally thereon. The width of the ramp is such that it will accommodate the skip 12 when same is drawn in on either the rope 65 or the rope 66.

The upper end of the ramp is provided with a curved guiding frame 515 which is generally elliptical in plan, being formed of two arcuate walls 515 and 516 concentric with the walls of the curved skip and thus formed to cooperate with the approach of the skip from either side. The walls 515 and 516 of said frame are constructed in the same manner as the bearing and guiding walls of the circular platform 10 and of the semi-circular platform 450. Said elliptical frame is centrally disposed on the ramp near the upper end thereof by axial supporting beams 517 and cross members 518. The purpose of said elliptical frame is, as shown, to guide the arms of the approaching skip inwardly to overhang its inner side as it is drawn to the end of its travel near the upper edge of the ramp, thereby to clear the approaching end of the skip and facilitate its withdrawal from the pile of coal which it deposits on the ramp. Thus the side 515 of the frame functions similarly to the curved wall of the circular platform 10, causing the arms of the skip to swing inwardly over the inner side thereof as it approaches the top portion of the ramp and to remain there as the skip is withdrawn by pull on the head rope. It will be understood that reverse pull on the head rope 65 will cause the skip 12 to be withdrawn from the top of the ramp and simultaneously cause the closed doors at the left-hand end of the skip to open. Thus the pile of coal in the skip will remain on the ramp while the skip withdraws and leaves the pile behind it.

While the form of skip shown in Figs. 14-16 (having the single pair of arms) is shown in Figs. 23 and 24 for simplicity, it will be understood that any of the forms of skips previously disclosed may be used with this apparatus. When the other forms of skips having the double sets of arms are used (the form of Fig. 8 for example), it will be understood that the elliptical frame serves to fold back the tail set of arms 111, 112 as the skip is drawn up the ramp so that said arms hang over the inner side of the skip. When the skip is withdrawn down the ramp to unload it, the head rope pulls the head set of arms 70, 80 around to the head end of the skip but the tail set of arms remains retracted against the inner curved side of the skip and they continue to remain in that position throughout the loading operation about the circular platform and until the skip has again cleared the circular platform by pull on the tail rope to withdraw the skip from said platform. It will also be recognized that the circular platform functions in much the same way to place the head set of arms 70, 80 in the idle position over the inner wall of the skip for the retreating motion of the skip. Consequently only one set of arms is capable of swinging around to the end of the skip and in every case it is that set on which pull is imparted by one of the ropes.

Guiding walls are preferably formed near the upper end of the ramp to guide same into its final or delivery position and to prevent coal from spilling or sliding over too much of the ramp surface. Thus curved walls 520 are provided near either outer side of the ramp and shorter inner walls 521 extend from the forward end of the elliptical frame 515 to the forward edge of the ramp. Suitable sheaves 522 are provided beyond the end of the elliptical frame for guiding the ropes to the drums.

Means are provided for preventing the ropes on the skip from rising and sliding off the sheaves 519 on the elliptical frame 515 as the skip travels along the mine floor approaching the ramp. It will be understood that the elevated position of the rope passing over the sheave 505 (in the case of rope 66) would tend to raise the rope above the plane of the ramp and away from the sheaves 519 until the skip has moved onto the ramp and lies in the plane thereof. To prevent this, we provide a special device for depressing the rope and holding same in the proper level along the ramp until the skip has travelled fully onto the floor of the ramp. As shown, a pivoted arm 530 is mounted to extend from the side 512 of the ramp and a horizontally rotatable roller 531 is mounted on said arm. Said roller overlies the incoming skip rope 66 and depresses same for the purpose stated. Said arm 530 is normally urged to extend across the path of the rope 66 by means of a spring 532 attached to a link 533 at the pivoted end of the arm and fixed elsewhere to the wall 512 of the ramp. When the oncoming end of the skip moves into the path of the arm 531 it forces same backwardly toward the side wall 512, as shown in Fig. 23. The length of the roller 531 is such that it continues to depress the rope 66 until the skip is substantially on the ramp whereupon the curved outer wall of the skip forces the arm against the side wall 512 of the ramp as shown. When the skip retreats downwardly on the ramp, the spring 532 automatically causes the arm 530 to return to its original position. A similar arm and attached apparatus is shown at the opposite side of the ramp for cooperation with a skip being indrawn by the rope 65.

The form of skip shown in Fig. 11 is designed to operate on the ramp without requiring the elliptical platform 515 or the like for the purpose of setting back the tail rope arms. In this form of skip, tail rope 66 draws the skip up the ramp by pulling on arm 211 against the tension of spring 215. When the skip reaches the upper part of the ramp, tension on the tail rope is relaxed and the skip comes to a halt. Contraction of the spring 215 thereupon causes the set of tail arms to rotate on their turn table to swing inwardly to overhang the inner side of the skip. The pull of the spring is sufficiently strong to retract the arms into that position even though there usually will be a pile of loose coal in the path of said arms. Hence the spring acts automatically to position the tail arms into the neutral or side-overhanging position as soon as the skip reaches the end of its discharging travel, thereby facilitating withdrawal of the skip without dragging back any coal. Said arms stay in that retracted position until pull is again exerted on the tail rope. Pull on the head rope 65 naturally causes the arms 180 and 190 to swing around in front of the head end of the skip. That pull also moves the turn table platforms toward the head end of the skip so that arms 211 and 212 move into the position shown in Fig. 11 and there remain until the skip is again retracted by tailward movement.

*Operation*

The operation of the invention in so far as the mechanical aspects thereof are concerned will be understood from the foregoing disclosure. Some description of the application of our mechanism to various mining operations will, however, be helpful in a further understanding of the objects and advantages of the invention. Typical operating set-ups for various coal mining operations are shown in Figs. 4 to 7.

In general it will be understood that all loading of shot-down coal into the skip takes place while the skip is being pulled by the head rope itno the coal on its inward movement, i. e. in the direction away from the ramp. Furthermore, all such loading takes place while the skip is in concentric and bearing relation to the circular guiding platform 10. Thus all movements of the skip into the shot-down coal are purely circular movements and are performed while the skip enjoys support from and rolling bearing contact with the thrust-resisting platform walls. The skip never advances beyond the point where it has become charged with a load of coal. That is, it is drawn into the pile of coal until it becomes filled and then immediately withdrawn, so that its loading movements are always progressively rotational about the circumference of the guiding platform and in consequence the skip never travels into the pile of coal any distance greater than that of its own arcuate length. It will further be noted that the entire width of the entering skip mouth is always open and free to receive coal, there being no obstructions or impedimenta in its path as it turns about the guiding platform for loading.

Continuous guiding and bearing support for the skip in any position and any direction of movement is made possible by the universal mobility of the guiding platform and also by the fact that said platform is no greater in length in any one direction than any other. By reason of this circular shape, the platform can be placed anywhere without increasing the amount of room it takes up in any direction and thus provides the maximum efficiency of movement and maneuverability within the limited space available in thin seam mines. Moreover, by reason of the reversibility of the skip construction, it is possible to bring in the skip along either side of the rope lines and thus approach and load-out coal from any quadrant of the guiding platform.

With these general principles in mind, a typical loading operation is shown in Figs. 4 and 5 for the advancing of a "room" after same has reached its full width. The pile of shot-down coal has been prepared for loading by the preliminary operations of cutting a kerf across the room and then shooting down the coal in the usual manner. It will be understood that such a pile of shot-down coal, after being disintegrated by the explosive, still presents a relatively solid and compact face. That is, shattering by explosive is kept to the minimum so as to produce a maximum of lump sizes which are economically more valuable. Hence it will be understood by those skilled in the art that the penetration and disengagement of shot-down coal by a skip or similar mechanism is more difficult than excavating a pile of loose gravel, dirt or the like. The power and efficiency of the loading equipment of the present invention are such that any loosening or disintegration of the semi-solid mass of shot-down coal is unnecessary in order to permit penetration of the skip into the pile for loading the same.

As shown in Fig. 4 the circular platform 10 is first advanced to substantial tangency with the pile of shot-down coal relatively close to the left-hand rib, leaving only sufficient clearance on the left-hand side for the passage of the skip as shown. From the position shown in Fig. 4 (the skip having come into concentric bearing relation with the periphery of the platform) the head rope continues to draw the skip so that it travels circularly about the platform and into the shot-down face until a full load of coal is charged into the open-mouthed skip. The position of the skip at such time is indicated in dotted lines in Fig. 4. Thereupon tension is released on the head rope and the skip stops its inward movement. Then the tail rope pulls to reverse the skip direction and simultaneously to close the doors at the head end. The skip retreats or withdraws over exactly the same path on which it entered, thus leaving a cleared arc in the mass of coal. The tail rope pulls the skip back, around the circular platform and clear of same. As soon as it is clear of the platform the pivoted arm to which the tail rope is attached swings around so that it projects in the line of the rope and the skip is drawn in a straight line by the tail rope to and onto the ramp as shown in Fig. 23.

It proceeds up the ramp to the top thereof, where the elliptical frame causes the tail arm to pivot back over the inner side of the skip as it travels up the ramp. The skip pushes ahead of it any pile of coal which may lie in its path on the ramp and stops near the top thereof by slacking on the tail rope tension. Pull is then exerted on the head rope to draw the skip down the ramp and simultaneously to open the doors at the head end so that the coal will remain on the ramp as the skip withdraws.

The foregoing loading and unloading operations are then repeated until all the coal within the ambit of movement of the skip about the circular platform 10 is loaded out. In order to load out the remaining coal between the periphery of the platform and the solid face (i. e. beyond the dotted arc in Fig. 4) the platform is then moved forward by the cooperation of the motor-driven screw 346 and the jacks 320 and 330 to such position, whereupon the loading operations are repeated until the coal is cleared out up to the solid face.

Fig. 5 shows a later operation in loading across the face of the room. For this purpose the guiding platform 10, which has been advanced as described so that the skip in travelling about it just clears the solid face of the coal, is now moved at right angles to its original path or in the direction of the arrow shown in Fig. 5. As will be understood, this movement is executed by rotating the loading platform 90° clockwise by means of the motor drive 357 and then advancing the platform in the new direction the required amount. As will be clear from Fig. 5 the skip is now in position to load out all of the width of the pile of shot-down coal by successive circular advancing movements about the platform along the dotted arc. After the skip has broken through to the front of the shot-down pile and withdrawn with its load, the platform will again be moved to the right a distance equal to the radial width of the skip and these operations repeated so that the coal across the face is loaded out in successive arcuate bites about the periphery of the loading platform.

In order to keep the head and tail ropes running substantially in their original lines along the rib, the semi-circular platform 450 (Fig. 5) is placed substantially in the original position of the circular platform 10, as it was in Fig. 4. As shown, said stationary semi-circular platform serves also as a turning guide and support for the skip in turning same by means of the pivoted arms into the crosswise path to approach the circular platform and also to turn and support the skip in its reverse movement as it withdraws loaded with coal.

Figure 7:
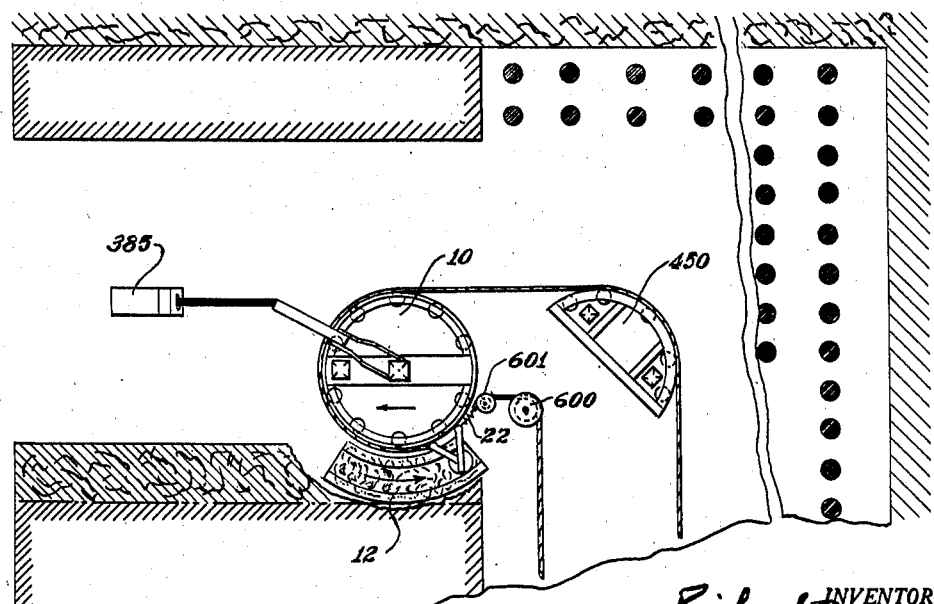
Fig. 7 is a similar diagram of another operation in connection with the taking out of a pillar.

Fig. 6 shows the operation of drawing or removing shot-down coal from the inner face of a pillar along a cross-cut. The general operation will be clear from the drawings. The position of the semi-circular platform 450 illustrates how that functions to permit placing of the circular platform and of the skip at right angles to the original rope lines for such operations. Also as shown in this figure the direction of advance of the circular platform 10 is backward, i. e. toward the direction of unloading rather than away from it, while the movement of the skip about the platform is counter-clockwise. The action of the skip in unloading coal at the rear side of the pillar will be obvious from the drawings. A similar operation is shown in Fig. 7 wherein the circular platform is being moved forwardly, i. e. away from the direction of unloading and the skip has a counter-clockwise loading movement about the platform.

In all these views the economy of space and the ability to timber closely to the loading operations will be obvious. In the arrangements shown in Figs. 5, 6 and 7 it will be noted that a supplementary rope sheave 600 is positioned opposite the semi-circular platform to provide equivalent directional guidance for the opposite or head rope. Said sheave is preferably fixed in position by means of a conventional hand jack. A similar smaller sheave 601 is also preferably provided adjacent the circular platform to limit the head movement of the skip as indicated.

Figure 25:
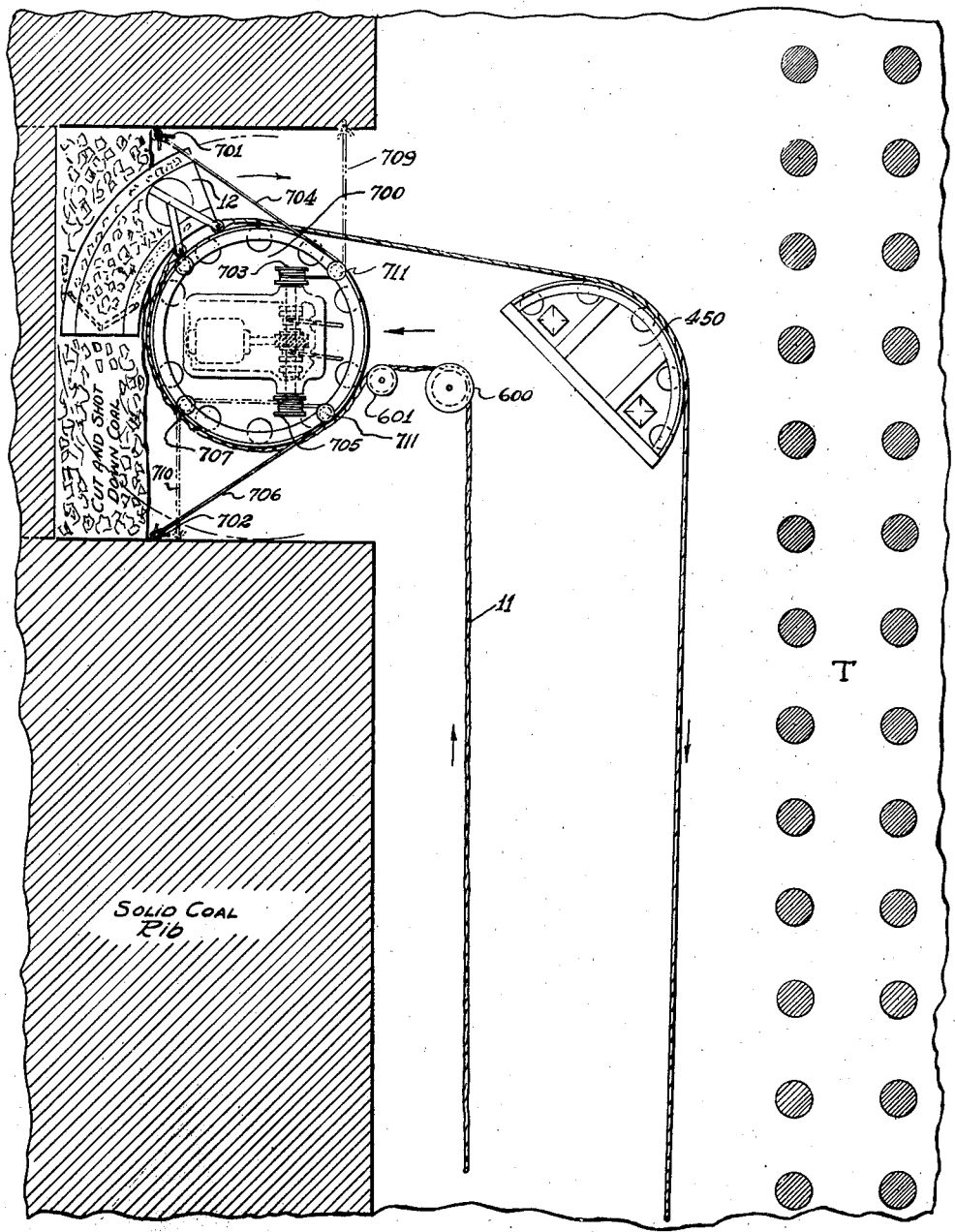
Fig. 25 is a diagrammatic view similar to Fig. 4 showing the operation of making a cross-cut with a modified form of loading guiding platform.

Fig. 25 illustrates use of the invention in driving a narrow cross-cut through the rib along one side of a room. Such cross-cuts are customarily made for purposes of cross-ventilation as the room advances and consequently are relatively narrow as they do not represent a substantial part of the mining operation as such. As shown the rope lines remain along the side of the rib in their usual positions while the cross-cut is made by turning the tail rope about the semi-circular platform 450 and the head rope 11 about the sheave 600 substantially as in Fig. 6. However, by means of the invention the width of the cross-cut is conveniently made equal to the diameter of the circular platform, plus substantially the radial distance of the outer wall of the skip 12 on either side of the circular platform.

The diameter of the circular platform in a preferred form of the mechanism for thin seam mining is about seven feet while the radial width of the skip may conveniently be three and one-half feet. Thus, with suitable clearances, the width of a cross-cut so formed will be about fifteen feet although it will be understood that said dimensions and relative proportions are merely given as illustrative and in no sense limiting of the invention. That is, a cross-cut of appropriate width can be conveniently made by merely straight forward motion of the circular platform, i. e. in the direction of the arrow. Consequently a very rapid and efficient loading operation can be effected with minimum locomotion of the circular platform and without any need for changing the positional arrangement of the semi-circular platform and other rope-guiding means throughout the entire operation of driving the cross-cut.

Fig. 25 also illustrates the facility of the invention for closely timbering throughout the advance of a room as it will be noted that only sufficient clearance need be left between the closest line of timbers T for the path of the skip in its withdrawal movement during room-advancing and cross-cut operations.

Fig. 25 also illustrates a modified form of means for imparting locomotion and directional movement to a circular platform. In this modification a relatively simple construction may be made for the circular platform 700. That is, the hydraulic or other power-operated jacks and the driving and directional motors of the form shown in Figs. 17 and 18 may be omitted and a relatively simple platform construction and mechanical jacks such as provided with the semi-circular platform of Figs. 21 and 22 may be used with the circular platform 700. In some cases the weight of the platform itself may make jacks unnecessary for holding the platform in place during loading. Advancing and transverse movements are imparted to the platform 700 by means of ropes attached to conventional hand jacks 701 and 702 which are placed as desired at either side of the platform and forwardly or backwardly thereof in the intended direction of advance and/or lateral movement. A motor-driven drum 703 is provided for operation of a cable 704 for the jack 701 and a similar drum 705 for the operation of cable 706 connected to jack 702. Said ropes are led from the drums above the path of the skip to the respective jacks around elevated sheaves 711. With the jacks positioned as shown, advancing movement (in the direction of the arrow) may be imparted to the circular platform by taking up equally on each drum and such movement is the only one required in the loading operation shown in Fig. 25.

It will be obvious, however, that straight lateral motion of the platform 700 may be provided in the case of cross-loading as in Fig. 5, for example. For that purpose the jacks 701 and 702 will be placed diametrally-opposite each other across the room on either side of the line of lateral movement and the ropes 704 and 706 will be guided around elevated sheaves 707 and 708 to properly aline the ropes 706 and 704 as indicated by the broken lines 709 and 710 on the drawings.

The invention in its broader aspects is not limited to the specific mechanisms shown and described but departures may be made therefrom within the scope of the accompanying claims without departing from the principles of the invention and without sacrificing its chief advantages.

What we claim is:

1. In apparatus for loading shot-down coal or the like, in combination, a skip, means for drawing said skip toward a pile of shot-down coal, skip-guiding means for changing the direction of the skip and affording bearing support thereto while it is being drawn into said pile to load it with coal, said skip having concentric curved side walls, an arm associated with said skip-drawing means, and held thereby projecting from the front of the skip when the skip is out of bearing contact with said guiding means, bearing means on said arm for guiding the skip around surfaces in its path including said skip-guiding means, said arm being movable from the front of the skip to the side thereof to lie between the skip and said guiding means while continuing to transmit pulling movement to the skip when the skip is in contact with said guiding means, closure means at the head end of the skip operated by the tail rope to close said head end when the skip is withdrawn.

2. In apparatus for loading shot-down coal or the like, in combination, a skip, means for drawing said skip toward a pile of shot-down coal, skip-guiding means for changing the direction of the skip and affording bearing support thereto while it is being drawn into said pile to load it with coal, said skip having spaced side walls, a pivoted arm projecting from the top of said skip over one of said walls and adapted to provide spacing and bearing contact between said skip and said guiding means in its path, and a rope cooperating with said arm for drawing the skip.

3. In apparatus for loading shot-down coal or the like, in combination, a skip, means for drawing said skip toward a pile of shot-down coal, skip-guiding means for changing the direction of the skip and affording bearing support thereto while it is being drawn into said pile to load it with coal, said skip having spaced vertical horizontally curved side walls, pivoted sets of doors at each end of the skip, means operated by the head-rope to hold open the doors at the head end of the skip, a tail rope and means operated thereby for closing the doors at the head end of the skip when pull is exerted on said tail rope, and means for rigidly holding the tail-end doors open.

4. In apparatus for loading and conveying broken solid material, in combination, a curved surface for providing a horizontal guiding and bearing support, and a skip adapted to be drawn along a mine floor and to engage said surface for guiding and bearing contact therewith while moving into a mass of said material to load the same, said skip having spaced side walls and an open end, ropes for moving the skip along a mine floor, a pair of pivoted divergent arms projecting from said skip, means operated by one of said ropes to move the skip in one direction, means operated by the other rope to move the skip in the opposite direction toward the guiding surface and to bring at least one of said arms into contact with said guiding surface, said arm being moved by such contact to space the skip from contact with said surface, said arm simultaneously moving the other arm so as to leave unobstructed the open end of the skip.

5. In apparatus for loading and conveying broken solid material, in combination, a curved surface for providing a horizontal guiding and bearing support, and a skip adapted to be drawn along a mine floor and to engage said surface for guiding and bearing contact therewith while moving into a mass of said material to load the same, said skip having spaced side walls and an open end, ropes for moving the skip along a mine floor, a pair of pivoted divergent arms projecting from said skip, means operated by one of said ropes to move the skip in one direction, means operated by the other rope to move the skip in the opposite direction toward the guiding surface and to bring at least one of said arms into contact with said guiding surface, said arm being moved by such contact to space the skip from contact with said surface, said arm simultaneously moving the other arm so as to leave unobstructed the open end of the skip, closure means for the open end of the skip and means operated by one of said ropes to close same when the skip has been loaded.

6. In apparatus for loading shot-down coal or the like, in combination, an arcuate guide positionable adjacent a face of shot-down coal, a skip designed to be drawn along the mine floor, a rope for pulling said skip along the floor on a line toward said guide, means comprising a pivotal arm carried by the skip and projecting from the body thereof to make initial contact with the periphery of the guide and thereby to change the direction of movement of the skip from said line of approach to an arcuate path about the surface of said guide.

7. In apparatus for loading shot-down coal or the like, in combination, an arcuate guide positionable adjacent a face of shot-down coal, a skip designed to be drawn along the mine floor, a rope for pulling said skip along the floor on a line, toward said guide, means comprising a pair of pivoted, divergent arms carried by the skip and projecting from the body thereof to make initial contact with the periphery of the guide and thereby to change the direction of movement of the skip from said line of approach to an arcuate path about the surface of said guide.

8. In apparatus for loading shot-down coal or the like, in combination, an arcuate guide positionable adjacent a face of shot-down coal, a skip designed to be drawn along the mine floor, a rope for pulling said skip along the floor on a line toward said guide, means comprising a pair of pivoted, rigidly inter-connected arms carried by the skip and projecting from the body thereof to make initial contact with the periphery of the guide and thereby to change the direction of movement of the skip from said line of approach to an arcuate path about the surface of said guide.

9. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the body thereof to make initial contact with the periphery of the guide and thereby to change the direction of movement of the skip from said line of approach to an arcuate path about the surface of said guide, said means comprising an arm pivotally movable from the front to the side of the skip.

10. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the body thereof to make initial contact with the periphery of the guide and thereby to change the direction of movement of the skip from said line of approach to an arcuate path about the surface of said guide, said means comprising an arm pivotally movable from the front to the side of the skip and having roller bearing means at its end for engaging the guiding surface of said guide.

11. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the body thereof to make initial contact with the periphery of the guide and thereby to change the direction of movement of the skip from said line of approach to an arcuate path about the surface of said guide, said means comprising a pair of arms pivotally movable together from the front to the side of the skip.

12. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the front end thereof while said skip is moving toward said guide, said means being movable by contact with the periphery of the guide from the front to the side of the skip and by said movement to force the skip out of its original line of approach and into an arcuate path about the surface of said guide.

13. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the open front end thereof while said skip is moving toward said guide, said means being movable by contact with the periphery of the guide from the front to the side of the skip and by said movement to force the skip out of its original line of approach and into an arcuate path about the surface of said guide, said means forming bearings between the skip and the surface of the guide during movement of the skip in said arcuate path.

14. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the open front end thereof while said skip is moving toward said guide, said means including a pivoted arm movable by contact with the periphery of the guide from the front to the side of the skip and by said movement to force the skip out of its original line of approach and into an arcuate path about the surface of said guide.

15. In apparatus for loading shot-down coal or the like, in combination, a guide positionable adjacent a face of shot-down coal, a skip designed to be drawn along the mine floor, a rope for pulling said skip along the floor on a line toward said guide, means carried by the skip and projecting from the open front end thereof while said skip is moving toward said guide, said means including a pair of pivoted arms movable together by contact of one of said arms with the periphery of the guide from the front to the side of the skip and by said movement to force the skip out of its original line of approach and into an arcuate path about the surface of said guide.

16. In apparatus for loading shot-down coal or the like, in combination, an arcuate guide positionable adjacent a face of shot-down coal, a skip designed to be drawn along the mine floor, a rope for pulling said skip along the floor on a line toward said guide, means carried by the skip and projecting from the open front end thereof while said skip is moving toward said guide, said means including a pair of pivoted arms movable together upon contact of one of said arms with the periphery of the guide from the front to the side of the skip and by said movement to force the skip out of its original line of approach and into an arcuate path about the surface of said guide, said arms having rollers forming bearing between the skip and the surface of the guide when the arms are in said sidewise position.

17. In apparatus for loading shot-down coal or the like, in combination, a support having an arcuate bearing surface positioned adjacent a face of shot-down coal and a guide surface located in rear thereof, a conformably arcuate skip designed to be drawn along the mine floor and to have bearing engagement with said bearing surface of the support, a rope for pulling said skip along the floor on a line tangentially toward said guide surface, and means on the skip operable as the skip approaches the guide surface and in cooperation therewith for moving the skip bodily transversely to said line of approach so as to change the line of the draft rope with respect thereto to prevent head-on contact of the skip with the guide surface of the support and to bring the skip into concentric relation with the bearing surfaces of the support.

18. In apparatus for loading shot-down coal or the like, in combination, a support having an arcuate bearing surface positioned adjacent a face of shot-down coal and a guide surface located in rear thereof, a conformably arcuate skip designed to be drawn along the mine floor and to have bearing engagement with the bearing surface of the support, a rope for pulling said skip along the floor on a line tangentially toward said guide surface, and means on the skip and operable as the skip approaches the guide surface in cooperation therewith for moving the skip bodily transversely to said line of approach to change the line of draft of the draft rope with respect thereto to prevent head-on contact of the skip with the guide surface of the support and to bring the skip into concentric relation with the guide bearing surface of the support, a rope for pulling the skip in the opposite direction and away from the bearing surface and rearwardly beyond the guide surface, and means operable as the skip leaves the bearing surface for bodily moving the skip out of concentric relation therewith and bringing it to a position tangential to the guide surface.

19. An apparatus for loading broken solid material at a loading point and conveying said material for discharge at an unloading point comprising in combination a support near the loading point having an arcuate bearing surface and a guiding surface, a reciprocatory skip having a lateral surface shaped to have bearing engagement with said arcuate bearing surface of the support, means for reciprocating the skip between an unloading point and said guiding surface and through a curved path about said arcuate bearing surface, said means including a draft element attached to the skip and disposed in the movement of the skip toward the guiding surface at a point removed from the lateral bearing surface of the skip to pull said skip toward said guiding surface in a straight line, and draft shifting means carried by the skip and operative between the skip and guiding surface when the skip approaches said surface for shifting the line of pull of the draft element on the skip to a point nearer said lateral bearing surface of the skip.

20. An apparatus for loading broken solid material at a loading point and conveying said material for discharge at an unloading point comprising, in combination, a support near the loading point having an arcuate bearing surface and a guiding surface, a reciprocatory skip having a lateral surface shaped to have bearing engagement with said arcuate bearing surface of the support, means for reciprocating the skip between an unloading point and said guiding surface and through a curved path about said arcuate bearing surface, said means including a draft element attached to the skip and disposed in the movement of the skip toward the guiding surface at a point removed from the bearing surface of the skip to pull said skip toward said guiding surface in a substantially straight line, draft shifting means carried by the skip and operative between the skip and said guiding surface when the skip approaches said surface for shifting the line of pull of the draft element on the skip to a point nearer said lateral bearing surface of the skip, said means and draft element being cooperatively related for engagement with the guiding and bearing surfaces of the support for coordinately moving the skip out of said straight line of approach and into concentric bearing engagement with said arcuate bearing surface of the support.

21. An apparatus for gathering loose broken material at a loading point and transporting said material to and discharging it at an unloading point comprising, in combination, a support having a curved bearing surface located adjacent to the loading point and a guiding surface located in rear of said bearing surface and between the same and the unloading point, a reciprocatory skip having a curved bearing surface for lateral bearing contact with the bearing surface of the support, a draft rope reeved about the bearing surface portion of the support and adapted to be extended tangentially therefrom toward the unloading point, said rope being connected to the skip and disposed in the movement of the skip toward the guiding surface at a point removed from the bearing surface of the skip for drawing the skip along said line of tangency toward the guiding surface and then into concentric bearing contact with the bearing surface and so as to cause said curved bearing surface of the skip to travel in a path intersecting the guiding and bearing surfaces of the support during said approaching movement of the skip, and controlling means on the skip operable by contact with the guiding surface for moving the skip transversely away from the guiding surface and shifting the line of draft to a point nearer its curved bearing surface until the curved bearing surface of the skip lies substantially outside said tangential line of approach, whereby to bring said curved bearing surface of the skip into position for concentric bearing relation with the bearing surface of the support without blocking the approaching movement thereof and without displacing the draft rope from its concentric and tangentially extending relation to the support.

22. An apparatus for loading broken solid material at a loading point and conveying the same for discharge at an unloading point including in combination a support having an arcuate forward bearing surface and a guide surface in rear thereof, a skip having a lateral bearing surface for bearing contact with said bearing surface of the support, a draft element at one end of the skip for moving said skip in one direction from the unloading point past the guide surface and into engagement with the bearing surface of the support and into a mass of said material while in bearing contact with said bearing surface to load the skip with a charge of the material, a draft element at the other end of the skip for moving the skip in the opposite direction over the same path for conveying the loaded material from the loading point to the unloading point for discharge, each of said draft elements being pivotally connected with the skip for shifting the line of draft laterally relatively thereto, and fender means associated with each draft element and engageable with the guide surface of the support for laterally shifting the skip and draft element relative to each other to adapt the skip to travel on a straight line past the guiding surface and out of contact therewith and into and out of concentric bearing engagement with the bearing surface of the support in its opposite gathering and conveying directions of travel.

23. An apparatus for loading broken solid material at a loading point and conveying the same for discharge at an unloading point comprising in combination a support having a front arcuate bearing surface and a rear guiding surface, a reciprocatory skip having a lateral surface shaped to have bearing contact with said bearing surface of the support, and draft means for reciprocating the skip and moving it in a curved path concentrically about the bearing surface of the support and in a straight path tangential to the guiding surface of the support between said guiding surface and an unloading point in rear thereof, said skip and draft means being pivotally coupled to adapt the skip to shift into and out of concentric bearing relation to the bearing surface of the support in moving into and out of engagement therewith, and said draft means including a member pivotally coupled therewith to the skip and projecting outward beyond the body of the skip for engagement with the guiding surface of the support to hold the skip out of engagement with said guiding surface and to guide the skip in its lateral shifting movements.

24. In an apparatus of the character described, the combination of a support having a curved bearing portion, a reciprocatory skip adapted for lateral bearing engagement with said bearing portion, head and tail draft ropes for reciprocating the skip, and a laterally swinging draft connection pivoted to the skip and having angularly related arms attached to one of said ropes, one of said arms being arranged to form a fender to engage a portion of the support and guide the skip into and out of engagement with the bearing portion of the support.

25. An apparatus for gathering loose broken material at a loading point and transporting it therefrom and discharging it at an unloading point, comprising supporting and guiding means disposed between said points and embodying a curved bearing surface positioned adjacent to the loading point and a curved guiding surface positioned between the bearing surface and the unloading point and in advance of the latter, a reciprocatory skip having a normally open gathering end and provided with a curved surface for lateral bearing engagement with the bearing surface of the support, a draft element for drawing the skip forwardly from the unloading point past the guiding surface of the support and about said bearing surface to the loading point and while in contact therewith gathering a charge of material through its gathering end, a draft element for drawing the charged skip rearwardly about the bearing surface and beyond the same and past the guiding surface to the loading point and discharging the load therefrom, said skip being coupled to the draft elements for lateral swinging movements relative thereto, and skip shifting means coupled to the skip and forming a fender guide projecting outwardly beyond the body of the skip for engagement with the guiding surface to shift the skip in the forward and backward movements between the unloading point and the bearing surface from a straight line travel position to a curved line travel position concentric with the bearing surface while holding the skip out of body contact with the guiding surface, and an openable and closable closure means for the gathering end of the skip opened and closed respectively by the pull of the draft elements on the rearward and forward movements of the skip.

26. In an apparatus for gathering loose broken material at a loading point and conveying said material therefrom to an unloading point, and in combination with a support having a curved bearing surface and a guiding surface, a skip reciprocable between said points and having a curved bearing surface at one side thereof for engagement with the bearing surface of the support, a draft element at each end of the skip pivoted to the skip to swing laterally of the skip between a draft line position located intermediate said sides of the skip and a draft line position located outwardly beyond the curved bearing surface of the skip, a draft rope connected to each draft element, each draft element being movable to the first-named draft line position under pull of its draft rope when the skip in its travel between said points is out of contact with the bearing surface of the support, and fender means controlled by the guide surface to shift each draft element to the second-named draft line position when the skip moves in bearing engagement with the bearing surface of the support and to permit the draft element to be shifted to the first-named draft line position when the skip moves out of bearing engagement with the bearing surface of the support.

27. An apparatus for loading broken solid material at a loading point and conveying the same for discharge at an unloading point including in combination a support having an arcuate bearing surface, a skip having a lateral surface shaped to have bearing contact with said surface of the support, a draft element for moving said skip in one direction into engagement with the bearing surface of the support and into a mass of said material while in bearing contact with said surface to load the skip with said material, a draft element for moving the skip in the opposite direction over the same path for conveying the loaded material from the loading point to the unloading point, and a pair of laterally swinging draft devices on the skip, one attached to the first-named draft element and the other to the second-named draft element, a closure at the loading end of the skip held open by the pull of the first-named draft element and closed by the pull of the second-named draft element, the laterally-swinging draft device attached to the first-named draft element being held away from the open loading end of the skip while the latter is in bearing contact with the bearing surface of the support.

RICHARD PEALE.
REMBRANDT PEALE, Jr.